(12) United States Patent
Woidasky

(10) Patent No.: US 12,030,104 B2
(45) Date of Patent: Jul. 9, 2024

(54) DEVICE AND METHOD FOR WORKPIECE PROCESSING

(71) Applicant: BYSTRONIC LASER AG, Niederoenz (CH)

(72) Inventor: Lars Woidasky, Gotha (DE)

(73) Assignee: BYSTRONIC LASER AG, Niederoenz (CH)

( * ) Notice: Subject to any disclaimer, the term of this patent is extended or adjusted under 35 U.S.C. 154(b) by 673 days.

(21) Appl. No.: 17/273,163

(22) PCT Filed: Sep. 18, 2019

(86) PCT No.: PCT/EP2019/074994
§ 371 (c)(1),
(2) Date: Mar. 3, 2021

(87) PCT Pub. No.: WO2020/058326
PCT Pub. Date: Mar. 26, 2020

(65) Prior Publication Data
US 2022/0347735 A1     Nov. 3, 2022

(30) Foreign Application Priority Data

Sep. 19, 2018   (DE) ................... 10 2018 123 034.6

(51) Int. Cl.
*B21D 5/02*        (2006.01)
*B21D 5/00*        (2006.01)
(Continued)

(52) U.S. Cl.
CPC ........... *B21D 43/003* (2013.01); *B21D 5/002* (2013.01); *B21D 5/02* (2013.01); *B21D 43/26* (2013.01); *F16P 3/00* (2013.01); *G02B 5/08* (2013.01); *G02B 26/00* (2013.01); *G05B 2219/42195* (2013.01)

(58) Field of Classification Search
CPC ........... B21D 5/02; B21D 5/002; B21D 43/26
See application file for complete search history.

(56) References Cited

U.S. PATENT DOCUMENTS

2019/0210083 A1     7/2019 Freudenthaler et al.

FOREIGN PATENT DOCUMENTS

| AT | 511111 B1 | * | 9/2012 | ........... B21D 43/003 |
| AT | 518639 B1 | * | 12/2017 | ........... B21D 43/003 |

(Continued)

OTHER PUBLICATIONS

International Search Report and Written Opinion, dated May 18, 2020, from PCT/EP2019/074994 filed Sep. 18, 2019.

*Primary Examiner* — Maurice C Smith
(74) *Attorney, Agent, or Firm* — Workman Nydegger

(57) ABSTRACT

The invention relates to a workpiece stop, a signal output device for outputting a signal directly perceivable to an operator of a workpiece processing machine from his/her working position, an imaging device for generating at least one image of the interior of a workpiece processing machine, a device for monitoring a processing position of a workpiece, a work-piece processing machine, a use of a device for monitoring a processing position of a work-piece, a use of a workpiece processing machine and a method for processing a workpiece in a workpiece processing machine. These devices and method promote safe and efficient operation of a workpiece processing machine.

39 Claims, 8 Drawing Sheets

(51) Int. Cl.
*B21D 43/00* (2006.01)
*B21D 43/26* (2006.01)
*F16P 3/00* (2006.01)
*G02B 5/08* (2006.01)
*G02B 26/00* (2006.01)

(56) References Cited

FOREIGN PATENT DOCUMENTS

| | | | |
|---|---|---|---|
| AT | 519644 A4 | 9/2018 | |
| AT | 519644 B1 * | 9/2018 | ............. B21D 5/002 |
| WO | 98/52719 A1 | 11/1998 | |
| WO | 2018/039696 A1 | 3/2018 | |

* cited by examiner

DEVICE AND METHOD FOR WORKPIECE PROCESSING

The invention relates to a workpiece stop, a signal output device for outputting a signal directly perceivable to an operator of a workpiece processing machine from his/her working position, an imaging device for generating at least one image of the interior of a workpiece processing machine, a device for monitoring a processing position of a workpiece, a workpiece processing machine, a use of a device for monitoring a processing position of a workpiece, a use of a workpiece processing machine, a method of processing a workpiece in a workpiece processing machine and a computer program.

The interior of workpiece processing machines is typically not or only partially visible to an operator from his/her working position. Thus, he/she cannot or can only insufficiently monitor the position of the workpiece, in particular the correct processing position of the workpiece from his/her working position.

Exemplary workpiece processing machines are bending machines or press brakes having a stable machine body with a fixed lower beam. A solid upper beam is movably attached to the machine body. This allows a torsionally rigid machine design, but prevents the operator from looking inside the machine, for example, at a rear stop with one or more finger stops for the workpiece. Prior to processing, the workpiece, e.g., a metal sheet, typically needs to be docked to the rear finger stop(s) and, in some cases, the position of the workpiece must be fixed for the processing operation. FIGS. 1a and 1b show schematic side views of a conventional bending machine 10, in front of which an operator B is from his/her working position. For the operation of the bending machine 10, the operator has a control panel 17 with foot pedals 18, which he/she can operate during the bending process from his/her working position. The upper beam 12 and lower beam 13, and the attached tools 14 block the view of the operator B of the finger stop 16 inside the machine. The operator must assume an unnatural position, stoop and look sideways at the tools 14 to control the workpiece position, e.g., the correct processing position on the finger stops 16. This is particularly disadvantageous in the case of processing machines in which the operator must hold and guide the workpiece during the processing process.

Finger stops with sensors for identifying the docked workpiece are known. Such finger stops limit the possible bending spectrum of the machine due to the sensor-related contour design and have no influence on the perception of the correct position. Although a signal can be output that causes the upper beam to move automatically, for example, the operator cannot control the position of the workpiece. Often, the workpiece is incorrectly struck and the operator must bend down to check the position. In addition, there is usually no optimal feedback on a positive contact of the workpiece with the stop. Either the workpiece processing process starts automatically or the operating unit generates an optical signal. Both variants are disadvantageous. The automatic start does not allow any subsequent changes to the workpiece position. The display in the operating unit requires a glance or even a rotation of the operator in the direction thereof, thus leading to reduced attention of the operator. The latter is disadvantageous, in particular when the operator must guide and hold the workpiece during the processing process.

Furthermore, systems for visualising the interior of the machine for controlling the workpiece position are known, for example using cameras. Here, the installation height and the position of the cameras are disadvantageous. A firmly installed camera for monitoring a rear stop is usually mounted at a great height and with a large viewing angle to detect the entire area of the rear stop. This leads to a perspective on the rear stop, which forces the operator to constantly change his/her view. Namely, the generated image presents a viewing angle, a gaze position, a gaze height, and/or a scale that does not correspond to the operator's reality and/or working position. This disrupts the operator and slows down the processing process.

The object of the invention is to provide devices and methods which promote the ease of use, the process reliability and the processing speed of a workpiece processing machine and/or a workpiece processing method.

This object is achieved by a workpiece stop according to claim 1, a signal output device according to claim 8, an imaging device according to claim 10, a device for monitoring a processing position of a workpiece in a workpiece processing machine according to claim 15, a workpiece processing machine according to claim 16, a use of a device for monitoring a processing position of a workpiece according to claim 20, a use of a workpiece processing machine according to claim 21, a method of processing a workpiece in a workpiece processing machine according to claim 22 and a computer program according to claim 26.

The embodiments according to the invention promote safe and efficient operation of a workpiece processing machine.

One embodiment relates to a workpiece stop for a workpiece processing machine, comprising at least one finger stop having at least one contact surface for a workpiece, wherein the at least one finger stop can be at least partially aligned for monitoring a contact of the workpiece with the workpiece stop and a position, in particular a correct processing position, of the workpiece in the workpiece processing machine.

The alignability of the finger stop when docking the workpiece facilitates not only the contact of the workpiece with the finger stop, but also for determining the correct position of the workpiece. Due to the spatial orientation of the finger stop when docking the workpiece, even the spatial orientation of the workpiece can also be recognised. This promotes the ease of use, process reliability and processing speed of a workpiece processing machine in which the workpiece stop is installed.

The at least one finger stop may be at least partially movably and/or rotatably seated in an end position corresponding to the correct processing position of the workpiece. Thus, the correct processing position of the workpiece can be determined particularly reliably.

The workpiece stop may include at least one sensor, wherein the at least one finger stop is associated in each case with at least one of the sensors. The sensor may be designed such that it determines the contact of the workpiece with the finger stop and an alignment of the finger stop corresponding to the correct processing position of the workpiece. This promotes the accuracy of the determination of the correct processing position of the workpiece.

The sensor may include a switch designed to detect the contact of the finger stop with the switch in the correct processing position of the workpiece. This can increase the accuracy of the setting and determination of the correct processing position.

The workpiece stop may include at least one of the following elements: at least one blocking element, wherein the at least one finger stop is associated with in each case at least one of the blocking elements and the blocking element is designed and/or positionable such that it blocks the movement and/or rotation of the finger stop in the end position; at least one preload element, wherein the at least one finger stop is associated with in each case at least one of the preload elements and the preload element is designed and/or positioned such that it provides a restoring force acting on the finger stop in the end position thereof.

The blocking element enables high process reliability by blocking the movement of the finger stop in the end position. In addition, by means of the blocking element, the moving parts of the finger stop can be adjusted according to the workpiece to be processed and are very stable.

With the preload element it can be ensured that the finger stop is released from the end position thereof when detaching the workpiece. This increases the reliability of the sensor and the determination of the correct processing position of the workpiece.

The at least one finger stop may have a lower part and an upper part and a central part arranged therebetween. The upper part and/or the lower part can be seated to be movable and/or rotatable relative to the central part. Thus, the positioning of the workpiece on the finger stop can be facilitated.

The central part can be immobile. The upper part and the lower part can be connected to each other, in particular firmly connected to each other. Thus, the upper part and the lower part can be moved together relative to the central part. The upper part and the lower part can be connected to each other via at least one connecting element. The upper part and the lower part can be connected to each other by at least one passage opening of the central part. At least one element selected from the upper part, central part and lower part may have a recess for receiving and/or fixing a corner of the workpiece. This promotes the fixation of the workpiece. The lower part and the central part can have an at least partially identical contour, in particular in the abutment region of the workpiece and/or in the region of the recess.

The upper part may be smaller than the central part and form an offset in the end position relative to the central part. Thus, the central part protruding in comparison to the upper part can serve as a support for a workpiece resting against the upper part. The central part may include a bearing surface for the workpiece. At least one element selected from the upper part and lower part may have one or more of the abutment surfaces. The movable upper and lower parts can therefore serve as abutment elements individually or together with the contact surfaces thereof.

The central part can be provided with a friction-reducing coating, in particular with a DLC ("diamond-like carbon") coating. The friction-reducing coating of the central part allows the smooth movement of the upper and lower part relative to the central part and effortless positioning of the workpiece. At the same time, the coating protects the central section from damage.

Due to the aforementioned individual or combined embodiments of the finger stop, damage to the finger stop can be avoided or reduced, and at the same time the upper, central and/or lower part in the optimal form thereof can be adapted to the spectrum of workpieces to be processed, for example, to the bending spectrum of the workpiece processing machine, and allow unrestricted positioning and processing. Furthermore, the operator of the workpiece processing machine does not need to change his/her working position in order to control the correct processing position of the workpiece, since this can be made recognisable by the spatial orientation of the finger stop when the workpiece is docked. Thus, the ease of use, the process reliability and the processing speed of a workpiece processing machine in which the signal output device is installed are promoted.

In one embodiment, a signal output device is provided for outputting a signal directly perceptible to an operator of a workpiece processing machine from his/her working position, including a vibration generating unit for generating and transmitting a vibration to an operating element of the workpiece processing machine as the signal. Due to the immediate perception of the output vibration signal, the operator of the machine does not need to change his/her working position to perceive the signal. Thus, the ease of use, the process reliability and the processing speed of a workpiece processing machine in which the signal output device is installed are promoted.

The vibration generating unit may be configured such that it can be coupled to the operating element in a vibration-transmitting manner. The vibration generating unit may include a mechanical and/or an acoustic vibration generator. Furthermore, the operating element may include one or more elements selected from a foot pedal, a floor mat, a handle, a remote control, a glove, a shoe, a watch, a mobile phone, a pair of headphones, a pair of glasses, a control panel, and any combination thereof. In addition, the signal output device can be configured for wired or wireless reception of a vibration-triggering control command.

A further embodiment relates to an imaging device for generating at least one image of the interior of a workpiece processing machine, in particular a workpiece processing machine with an interior which is not or is only incompletely visible to an operator from his/her working position, including an image capturing unit designed to receive at least one image of the interior of the machine or a part of the interior; and an image display unit configured to display the at least one image, wherein at least one of the image capturing unit and the image display unit is configured to present the image corresponding to a virtual perspective of the interior of the machine for the operator from his/her working position. In this way, an image which reproduces the interior of a workpiece processing machine can be generated and presented to the operator equipped with the imaging device in the perspective he/she would see from his/her working position if the workpiece processing machine on the operator side contained transparent components. The imaging device thus allows the operator to control the processing position of the workpiece without changing the working position. This promotes the ease of use, process reliability and processing speed of a workpiece processing machine which is equipped with the imaging device.

The imaging device can further include a unit for detecting the working position of the operator; and/or a projection unit configured to project a mark of a correct processing position of a workpiece to be processed into the inside of the machine. The unit for determining the working position of the operator enables an automated generation of the virtual perspective of the operator. With the projection unit, a desired workpiece processing position can be projected into the inside of the workpiece processing machine, thus guiding the operator through the processing operation.

The image capturing unit can include at least one mirror, in particular an adjustable mirror, for mirroring the interior of the machine and/or at least one camera for capturing at least one image of the mirrored interior. Thus, the mirror can be adjustably formed at a height and/or inclination relative to the vertical, for detecting the at least one image of the mirrored interior corresponding to the virtual perspective of the operator into the interior of the machine from his/her working position. Thus, by adjusting the mirror, the at least one image of the mirrored interior can be detected corresponding to the virtual perspective of the operator of the interior of the machine from his/her working position.

The image display unit can include being or is or can be connected to a computing unit for converting the at least one image of the mirrored interior according to correspond to the virtual perspective of the operator to the inside of the machine from his/her working position. In this way, the image can be adapted in a computerised manner to the virtual perspective of the operator of the inside of the machine from his/her working position and/or at least be partially generated as a simulation of the virtual perspective of the operator of the inside of the machine from his/her working position.

In one embodiment, a device for monitoring a processing position of a workpiece in a workpiece processing machine, in particular a bending press and/or press brake, is provided, including at least one element selected from a workpiece stop according to any one of the preceding embodiments; a signal output apparatus according to any one of the preceding embodiments, and an imaging device according to any one of the preceding embodiments. The device for monitoring a processing position of a workpiece offers the individual or combined advantages of the elements contained therein, i.e., the workpiece stop, the signal output device, and/or the imaging device. This improves the ease of use, process reliability and processing speed during workpiece processing.

Another embodiment relates to a workpiece processing machine, in particular a workpiece processing machine with an interior which is not or is only incompletely visible to an operator from his/her working position, in particular a bending press and/or press brake, including at least one element selected from a workpiece stop according to any one of the preceding embodiments; a signal output device according to any one of the preceding embodiments, and an imaging device according to any one of the preceding embodiments. In the workpiece processing machine, the advantages of the elements contained therein, i.e., the workpiece stop, the signal output device, and/or the imaging device are realised individually or in any combination. This promotes the ease of use, process reliability and processing speed of the workpiece processing machine.

The workpiece processing machine may include the imaging device according to any one of the preceding embodiments having at least one mirror for mirroring the interior of the machine and at least one camera for capturing at least one image of the mirrored interior, wherein the mirror is arranged on an inside of the machine of the operator's virtual perspective of the interior of the machine corresponding to his/her working position, the camera being aligned with the mirror, and the image display unit being arranged on an outside of the machine of the virtual perspective of the operator on the inside of the machine from his/her working position. As a result, the ease of use, the process reliability and the processing speed of the workpiece processing machine are further supported, in particular, the operator can follow the workpiece processing process without changing his/her working position.

In the workpiece processing machine, the inside of the machine can comprise at least one stop selected from a workpiece stop, a workpiece rear stop, and a workpiece stop according to any one of the preceding embodiments; and the imaging device can be formed to capture an image of the stop. With this configuration, the operator can see on the outside of the machine with an unchanged working position if and when the workpiece is arranged in the desired processing position on the stop.

The workpiece processing machine may include a workpiece stop according to any one of the preceding embodiments and a signal output device according to any one of the preceding embodiments, wherein the signal output device is configured to output a signal triggered by the at least one sensor of the workpiece stop in the correct processing position of the workpiece. This design also allows the operator of the machine to recognise with an unchanged working position if and when the workpiece is arranged in the desired processing position on the stop.

In a further embodiment, a device for monitoring a processing position of a workpiece according to any one of the preceding embodiments is used in a bending press and/or press brake. In another embodiment, a workpiece processing machine according to any one of the preceding embodiments is used for bending and/or folding a workpiece. Both applications make it possible to optimise the ease of use, process reliability and processing speed during a bending press and/or folding process.

Another embodiment specifies a method for processing a workpiece in a workpiece processing machine, in particular in a workpiece processing machine with an interior which is not or is only incompletely visible for an operator from his/her working position, in particular in a workpiece processing machine according to any one of the preceding embodiments. The method includes at least one step selected from: contacting the workpiece with at least one finger stop of the machine that can be at least partially aligned and aligning the finger stop according to a correct processing position of the workpiece; generating and transmitting a vibration to an operating element of the machine as a signal; and, receiving at least one image of the interior of the machine and displaying the at least one image on an exterior of the machine, corresponding to and in the position of a virtual perspective of the operator of the interior of the machine from his/her working position. This allows the operator to follow the workpiece processing operation, in particular to control the correct processing position of the workpiece without changing his/her working position. This promotes ease of use, process reliability and the processing speed of the workpiece processing.

In the method, the vibration of the operating element can indicate the contact of the workpiece with the at least one finger stop and the correct processing position of the workpiece; and/or the at least one image can reproduce the at least one finger stop; and/or the capture can include mirroring the interior of the workpiece processing machine in a mirror arranged to correspond to the virtual perspective of the operator and capturing at least one image of the mirrored interior.

In the method, the capturing can include detecting the mirrored interior, in particular adjusting the mirror at a height and/or inclination relative to the vertical, corresponding to the virtual perspective of the operator of the interior of the machine from his/her working position.

In the method, the displaying can include transforming the at least one image of the mirrored interior corresponding to the virtual perspective of the operator to the interior of the machine from his/her working position; and/or the step of receiving and displaying the at least one image of the interior of the machine can include determining the working position of the operator. In this way, the image can be adapted in a computerised manner and/or automatically to the virtual perspective of the operator of the inside of the machine from his/her working position and/or at least partially generated as a simulation of the virtual perspective of the operator of the inside of the machine from his/her working position. The conversion can preferably be carried out by a computer program, in particular from the embodiments. The computer program can calculate from the captured image a second image representation, which represents the same object (interior of the machine and in particular the area of the finger stop) in a different perspective. The different perspective may correspond to the perspective of the operator from his/her working position when inserting the metal sheet into the machine.

The computer program may be configured as executable code (e.g., already compiled as machine code) or as byte code on the imaging device and in particular in the computing unit thereof. The computer program may comprise instructions for converting the captured image.

The computer program may be stored locally in a memory of the imaging device. The computer program may alternatively or cumulatively also be downloaded for the purpose of local execution from a central computer unit (e.g., server) in data communication with the imaging device. Alternatively, the computer program may also be executed on the central computer unit, which then returns the result of the computer-based computation to the imaging device so that the image display unit can display the computed image from the perspective of the operator.

In a further embodiment, the invention relates to a computer program for operating a signal output device, as described above, when the computer program is executed on the signal output device.

In a further embodiment, the invention relates to a computer program for operating an imaging device, as described above, when the computer program is executed on the imaging device.

In a further embodiment, the invention relates to a computer program for operating a workpiece processing machine, as described above, when the computer program is executed on the workpiece processing machine. The computer program may relate in particular to a control of the workpiece stop and the signalling thereof by the sensor.

A further embodiment relates to a computer program for operating a signal output device according to any one of the preceding embodiments and/or for operating an imaging device according to any one of the preceding embodiments and/or for operating a workpiece processing machine according to any one of the preceding embodiments, if the computer program is executed on a computer, the signal output device, the imaging device and/or on the workpiece processing machine.

The preceding embodiments and method modifications support ease of use, process reliability, and processing speed of the workpiece processing.

In the following detailed description, non-limiting exemplary embodiments will be discussed with the features and other advantages thereof with reference to the drawing.

DETAILED DESCRIPTION OF THE INVENTION

Figure 1B:
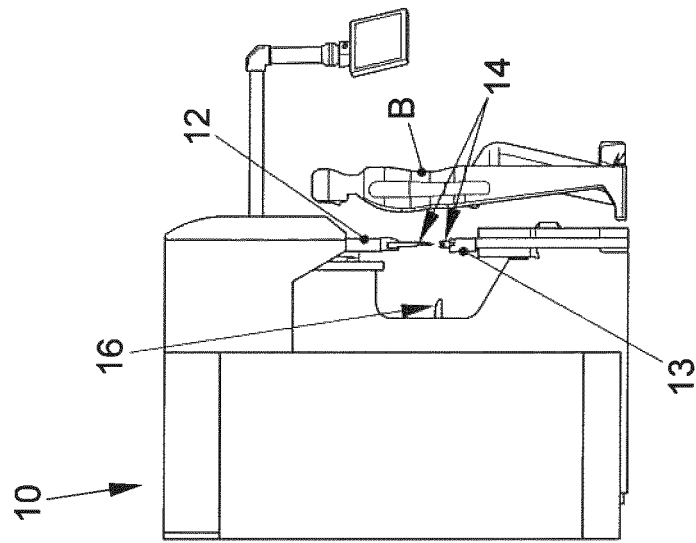
FIGS. 1a and 1b show schematic side views of a conventional workpiece processing machine.
Figure 1A:
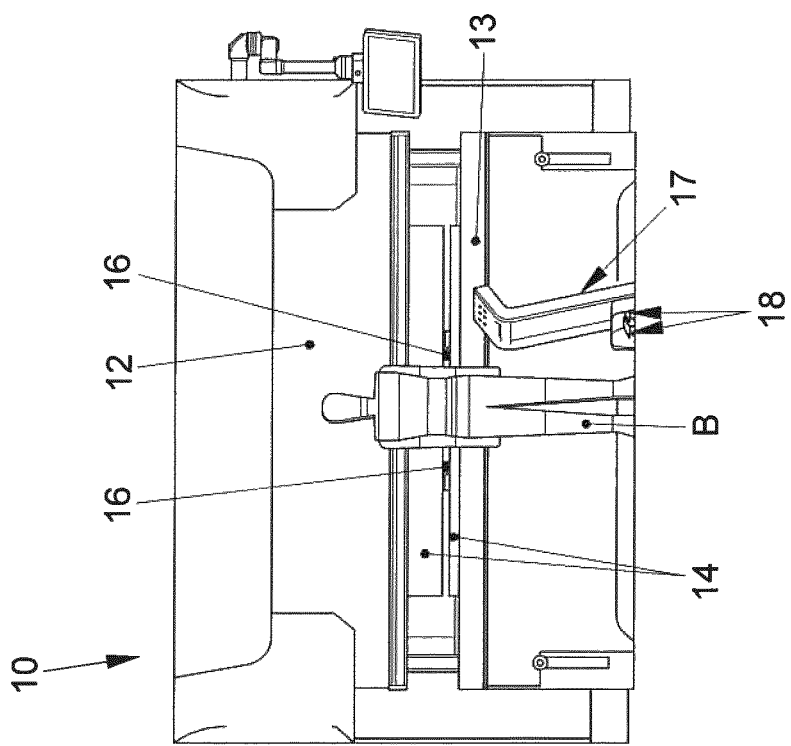

In the following description, with reference to the figures, the same reference numerals designate the same elements. In general, only the differences between the individual embodiments will be described.

In the embodiments, the term "virtual perspective of the operator of the inside of the machine from his/her working position" means a perspective of the inside of the machine that the operator would see in a working position if the workpiece processing machine on the operator side were to have transparent components, e.g., a transparent upper beam, or if these obstructing components did not exist.

In addition, the term "virtual perspective of the operator of the interior of the machine from his/her working position" used in the embodiments may include a constant and/or a variable virtual perspective. Firstly, in the embodiments, the image of the machine interior may be presented corresponding to a constant perspective of the operator that does not change as the operator's working position changes. In particular, the image captured and/or displayed in the embodiments may be presented constantly in the perspective that the operator adjusts and/or that corresponds to one of his/her working positions, for example the working position at the start of the workpiece processing process. Alternatively or additionally, in the embodiments, the image of the machine interior may be presented according to a variable perspective of the operator, which changes as the operator's working position changes.

In addition, in the embodiments in which a part of an image capturing unit and/or an image display unit are arranged according to the "virtual perspective of the operator of the interior of the machine from his/her working position", the part of the image capturing unit and/or the image display unit can be arranged and/or movable on the inside or the outside the machine corresponding to a constant and/or a variable virtual perspective of the operator. For example, the part of the image capturing unit and/or the image display unit may be statically arranged on the machine according to the constant perspective in the working position of the operator at the beginning of the workpiece processing process. In examples in which the image display unit is arranged on a moving upper beam, the image display unit may be statically arranged on the upper beam in correspondence with the constant perspective of the operator's working position at the beginning of the workpiece processing process and can move with the upper beam. Alternatively or additionally, the arrangement of the part of the image capturing unit and/or the image display unit on the machine can be dynamically changed at least partially corresponding to a changed working position of the operator.

In the embodiments, the term "corresponding to a virtual perspective of the operator of the interior of the machine from his/her working position" may be understood as "substantially corresponding to a virtual perspective of the operator of the interior of the machine from his/her working position". This means that small deviations from the perspective of the operator and deviations within a margin can be comprised. The same applies to variations of this term.

In the embodiments, the term "computing unit" may be understood as being included in a controller or connectable or connected to a controller, e.g., wirelessly or via data-carrying connections. The controller may, for example, be embodiments of or comprise a controller of an imaging device, a controller of a device for monitoring a processing position of a workpiece, and/or a controller of a workpiece processing machine.

The computing unit can be formed in a preferred embodiment of the invention in the imaging unit. The computing unit can be designed to execute a computer program, in particular of embodiments. The computer program may comprise several sections that have different functionalities. Thus, a first section may relate to the conversion and/or image reproduction, a second section may relate to the monitoring of the processing position of the workpiece, and a third section may relate to the control of the workpiece processing machine. All sections are referred to below as a computer program.

The computer program can thus relate to the conversion of the captured image into the operating perspective and/or a simulated representation of the computed image.

The computer program may relate to the monitoring of a processing position (e.g., with a TARGET-ACTUAL comparison of the processing position and optionally taking into account a predefined tolerance range). The computer program of the embodiments may therefore be designed to operate a device for monitoring a processing position of a workpiece in a workpiece processing machine, in particular a bending press and/or press brake, according to any one of the preceding embodiments if the computer program is executed on a computer and/or the device for monitoring the processing position.

The computer program can be designed to control the workpiece processing machine.

The computer program may be configured as executable code (e.g., already compiled as machine code) or as byte code on the imaging device and in particular in the computing unit thereof. The computer program may be stored locally in a memory of the respective device (e.g., imaging device). The computer program may alternatively or cumulatively also be downloaded for the purpose of local execution from a central computer unit (e.g., server) in data communication with the respective device. Alternatively, the computer program can also be executed on the central computer unit, which then sends back the result of the computer-based computation to the respective device (e.g., imaging device) so that the result can be provided there locally (e.g., for the purpose of output, display on a display device, for control and/or further processing).

Embodiments of the invention can also be used for the automation of workpiece processing machines with concatenation of different types of systems, e.g., using a robot unit. A robot unit and the workpiece processing machine of embodiments may thus be combined. The robot unit and the workpiece processing machine can each be treated as a single system and linked together with mechanical, digital and/or control technology type interfaces (e.g., via a network or a bus system), in particular via a controller. For this purpose, a computer program can be used. Furthermore, the finger stop(s) of the workpiece stop of the embodiments may serve as an interface. In addition, the sensor of the workpiece stop of the embodiments can be used for outputting a signal to the robot unit for displaying the position of the workpiece, in particular the correct processing position. Embodiments of the invention therefore relate to a combination of a robot unit and a workpiece processing machine of the embodiments.

The robot unit can in particular be controlled on the basis of signals from the sensor of the workpiece stop. The robot unit can be used to position the workpiece in the workpiece processing machine. Thus, a further degree of automation can advantageously be achieved.

Workpiece Stop

As explained above, one embodiment relates to a workpiece stop for a workpiece processing machine, comprising at least one finger stop having at least one contact surface for a workpiece, wherein the at least one finger stop can be at least partially aligned for, in particular simultaneous monitoring of a contact of the workpiece with the workpiece stop and a position, in particular a correct processing position of the workpiece in the workpiece processing machine. By means of the use of at least one finger stop, a positioning of the workpiece can be realised in two directions in a desired position, in particular in the correct processing position. When using at least two finger stops it can also be achieved that the workpiece within the machine can be flexibly fixed depending on the desired processing position.

The workpiece stop may be a rear stop of a workpiece processing machine or part of a rear stop of a workpiece processing machine. Furthermore, the workpiece stop may contain more than one finger stop. In this case, at least one of the finger stops may be mirror-inverted to at least one other of the finger stops.

The at least one finger stop may be at least partially movably and/or rotatably seated in an end position substantially corresponding to the correct processing position of the workpiece. The finger stop, in the end position thereof, may be movable and/or rotatably configured and/or seated, for example, at an angle of 0.1° to 5°, preferably 0.5° to 2°, more preferably 1.0° to 1.5°. This allows a particularly accurate setting and determination of the correct processing position.

The workpiece stop may include at least one sensor, wherein the at least one finger stop is associated in each case with at least one of the sensors. The sensor may be designed such that it determines the contact of the workpiece with the finger stop and an alignment of the finger stop corresponding to the correct processing position of the workpiece. This promotes the accuracy of the determination of the correct processing position of the workpiece. In addition, with the aid of the sensor, a signal can be triggered and/or generated which indicates to the operator that the correct processing position has been reached. For this purpose, the sensor can be connected to a signal output device and/or control in a wireless or wired data-conducting manner. The signal may be immediately perceived by an operator of a workpiece processing machine from his/her working position. For example, the signal may be output as a vibration of an operating element of a workpiece processing machine. For this purpose, the sensor may be connected directly or via a controller with a vibration generating unit for generating and transmitting a vibration to an operating element of the workpiece processing machine as the signal. The vibration may, for example, have a frequency of 30 to 800 Hz and an amplitude of 1 to 10 mm, and further may be output continuously or discontinuously, for example, at intervals.

The sensor may include a switch designed to detect the contact of the finger stop with the switch in the correct processing position of the workpiece. The switch may be a mechanical switch, for example.

The workpiece stop may include at least one blocking element, wherein the at least one finger stop is associated in each case with at least one of the blocking elements and the blocking element is designed and/or positioned such that it blocks the movement and/or rotation of the finger stop in the end position. The blocking element enables high process reliability by blocking the movement of the finger stop in the end position. In addition, by means of the blocking element, the movable parts of the finger stop can be adjusted to substantially correspond to the workpiece to be processed and are particularly stable. In particular, the blocking element can be adjustable, for example designed as an adjustable wedge.

The workpiece stop may comprise at least one preload element, wherein the at least one finger stop is associated with in each case at least one of the preload elements and the preload element is designed and/or positioned such that it provides a restoring force acting on the finger stop in the end position thereof. With the preload element it can be ensured that the finger stop is released from the end position thereof when detaching the workpiece. This increases the reliability of the sensor and the determination of the correct processing position of the workpiece.

The at least one finger stop may have a lower part and an upper part and a central part arranged therebetween. The upper part and/or the lower part can be seated to be movable and/or rotatable relative to the central part. The upper part and/or the lower part may be movable and/or rotatably seated, for example, at an angle of $0.1°$ to $5°$, preferably $0.5°$ to $2°$, more preferably $1.0°$ to $1.5°$. Thus, the positioning of the workpiece on the finger stop can be facilitated.

The central part can be immobile. The central part can thus be configured to be stationary, while the lower part and/or the upper part can be movable and/or rotatable relative to the central part. The central part can thus define the optimum processing position of the workpiece. Furthermore, the central part can serve as a particularly stable support, since it is immovable.

The upper part and the lower part can be connected to each other, in particular firmly connected to each other. In this way, the upper part and the lower part can be moved together relative to the central part. The upper part and the lower part can be connected to each other via at least one connecting element. The upper part and the lower part can be connected to each other by at least one passage opening of the central part. In particular, the upper part and the lower part can be connected to each other by at least one passage opening of the central part.

For example, the upper part and the lower part may be connected to each other via at least one connecting element, which extends through at least one passage opening of the central part and is movably and/or rotatably provided or seated therein. In the embodiments, a plurality of connecting elements and a plurality of passage openings may be provided. For example, a first connecting element can be rotatably seated in a first passage opening of the central part and a second connecting element can be provided movably in a second passage opening of the central part. As a result, the first connecting element allows the rotation of the upper and lower parts by a rotation angle relative to the central part, while the second connecting element can define a range for the angle of rotation, e.g., a maximum angle of rotation, via the extent of the mobility thereof in the second passage opening. The connecting elements and the associated passage openings may be provided at a plurality of, in particular spaced, positions of the finger stop. The at least one connecting element can be designed as a connecting pin or as part of the upper and/or lower part.

At least one element selected from the upper part, central part and lower part may have a recess, in particular a lateral recess, for receiving and/or fixing a corner of the workpiece. This promotes the fixation of the workpiece. The lower part and the central part can at least partially have an identical contour, in particular a contour identical to that of the recess and/or the contact surfaces for the workpiece. The recess of the upper part may have a contour that differs from the contour of the central and/or lower part. In particular, the recess of the upper part may be larger than that of the central and/or lower part. Furthermore, the upper, central and/or lower part may be designed to be substantially or partially horseshoe-shaped or hook-shaped, in particular in the region of the respective recess.

In some embodiments, the central part has a recess as mentioned above, so that after the positioning of a workpiece, for example a metal sheet, on the lower part, the workpiece can pivot upwards during the actual processing process, e.g., bending process. By means of the recesses of the lower part and/or upper part it can also be avoided that upon docking of a workpiece, a force is exerted directly on the bearing of the upper and/or lower part, and/or the recesses may cause a rotation or turn of the upper and/or lower part on contact with the workpiece. The upper part may be smaller than the central part and form an offset in the end position relative to the central part. Thus, the central part protruding in comparison to the upper part can serve as a support for a workpiece resting against the upper part. The central part may include a bearing surface for the workpiece. Thus, a deflection of the docked workpiece stop on the workpiece, e.g., a metal sheet, can be avoided.

At least one element selected from the upper part and lower part may have one or more of the abutment surfaces. The movable upper and lower parts can therefore serve as abutment elements individually or together with the contact surfaces thereof.

The central part can be provided with a friction-reducing coating, in particular with a DLC ("diamond-like carbon") coating. At least the bearing surface for the workpiece and/or the surfaces of the central part which are in contact or come into contact with the upper and/or lower part can have the friction-reducing coating. The friction-reducing coating of the central part allows the smooth movement of the upper and lower part relative to the central part and effortless positioning of the workpiece. At the same time, the coating protects the central section from damage. The DLC coating can be, for example, an amorphous carbon layer, with a layer thickness of 1 to 10 µm, a hardness of 20 to 30 GPa, applied with PACVD (plasma-assisted chemical vapour deposition) or with PVD (physical vapour deposition). The upper, central and/or lower part may be at least partially set back in the workpiece docking direction and/or may at least partially have a chamfer and/or a rounding on the edges. In this way damages on contact with the workpiece can be avoided. For example, the upper, central and/or lower part may be set back from each other. In the embodiments, set back means that the respective upper, central and/or lower part is shorter than one of the adjacent other parts in the docking direction by 0.5 to 3 mm. Furthermore, the upper, central and/or lower part at the edges of the support surface and/or the contact surfaces and/or the surfaces on which the workpiece can engage during operation at least partially in the workpiece docking direction have a chamfer the range of $0.5×5°$ to $4×60°$ and/or have a rounding.

In particular, the lower part can be at least partially set back in the region of a possible direct force application to the bearing thereof in the workpiece docking direction relative to the central part. If the lower part is set back relative to the central part, no workpiece can be docked in the recessed area of the lower part and thus no direct force can be exerted on the bearing of the lower part.

In addition, the central part may be at least partially set back in the region of one or more contact surfaces of the lower part with respect to the latter in the workpiece docking direction. Thus, the lower part in the region of the lateral contact surface(s) may be slightly raised relative to the central part. In addition, the lower part can be provided up to the central part with a chamfer, for example of 1×30°. With both measures alone or in combination, the lower part and the bearing of the upper and/or lower part can be protected against the workpiece sliding down. Thus, it can be effected that a sliding workpiece slips past the central part and onto the chamfer and does not rest on the lower part through the chamfer, but laterally comes to rest on the lower part and/or presses the lower part against the sensor. In addition, the lower part may be at least partially set back in the area outside of one or more contact surfaces relative to the central part and thus protected against incorrect positioning.

Due to the abovementioned embodiments of the finger stop, individually or in combination, damage to the finger stop and the workpiece stop can be avoided or reduced. Namely, damage, in particular by external forces, for example in the case of improper docking of the workpiece, can be avoided by means of the embodiments mentioned, e.g., shapes or coatings of the central, upper and/or lower part. At the same time, the upper, central and/or lower part can be optimally adapted in shape to the spectrum of the workpieces to be processed, for example to the bending spectrum of the workpiece processing machine, and allow unrestricted positioning and processing. Furthermore, the central part can protect the movable upper and lower parts, since improperly docked or falling workpieces cannot damage the bearing of the finger stop or the bearing of the upper and lower parts by means of a roller bearing, for example.

Furthermore, the operator of the workpiece processing machine does not need to change his/her working position in order to control a correct processing position and/or a correct fixing of the workpiece, since these can be made recognisable by the spatial orientation of the finger stop when the workpiece is docked. This promotes the ease of use, process reliability and processing speed of a workpiece processing machine which is equipped with the workpiece stop.

Figure 2B:
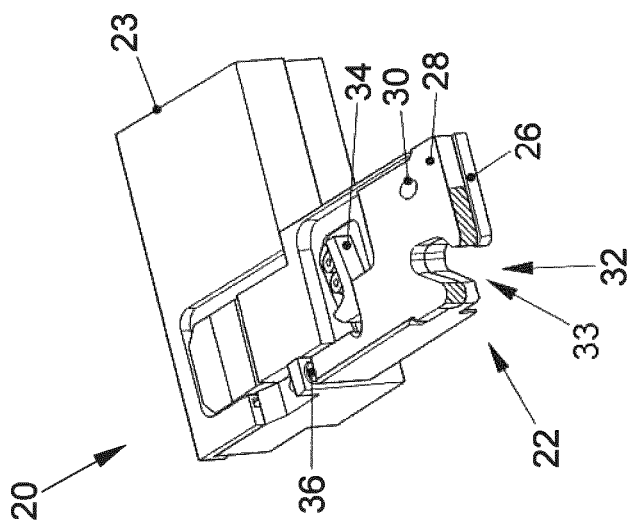
FIGS. 2a to 2d show schematic and partial perspective views and a cross-sectional view of an example of a workpiece stop according to the invention.
Figure 2A:
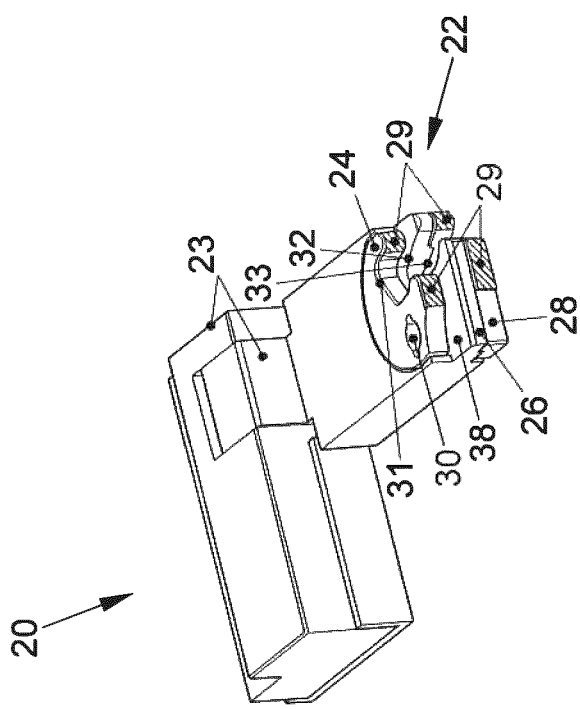
Figure 2C:
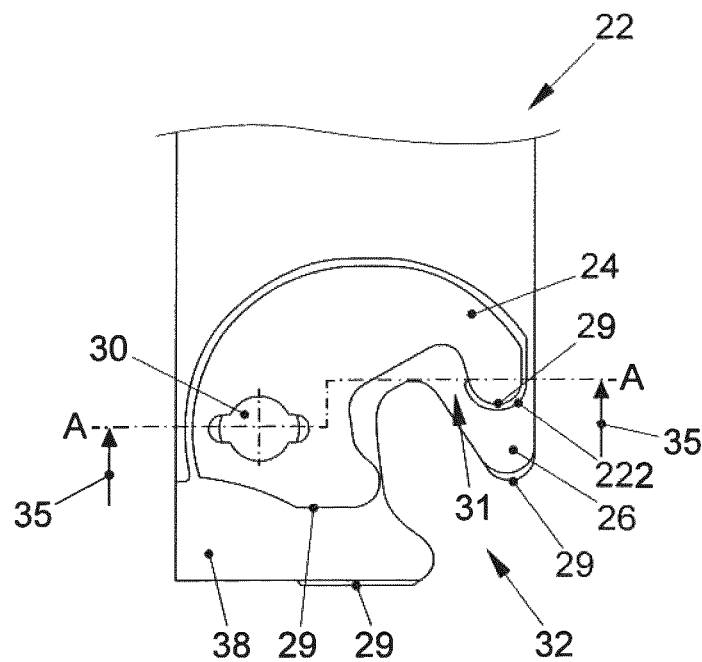
Figure 2D:
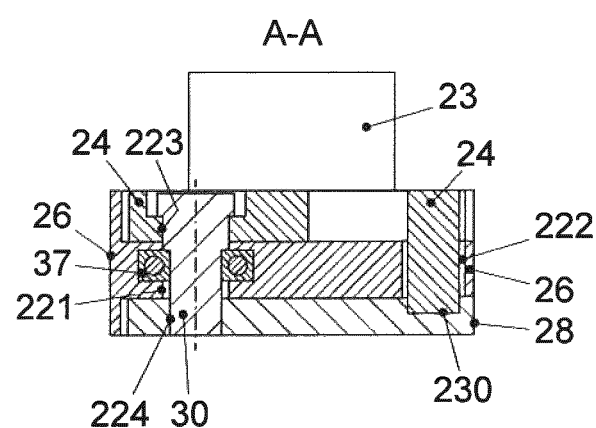

FIGS. 2a to 2d show schematic and partial perspective views and a cross-sectional view of an example of a workpiece stop 20 according to the invention. In this example, the workpiece stop 20 comprises a finger stop 22. FIGS. 2a and 2b represent the finger stop 22 attached to a bracket 23. FIG. 2a presents the workpiece stop 20 in a lateral perspective from above. FIG. 2b shows the workpiece stop 20 in a perspective from below, which is rotated by 180° in comparison to FIG. 2a. FIG. 2c shows the free end of the finger stop 22 in a plan view from above, while FIG. 2d shows a lateral cross-sectional view along the line A-A of FIG. 2c in the direction of the arrows 35.

The finger stop 22 has an upper part 24, a central part 26 and a lower part 28. The central part 26 is attached to the bracket 23 and has a free end on which the upper part 24 and the lower part 28 are arranged. The free end of the central part 26 has a flat upper side and a flat lower side which are interconnected by a contoured side surface. The upper part 24 and the lower part 28 each have a flat upper side and a flat lower side which are each connected by a circumferential, contoured side surface. The lower part 28, the free end of the central part 26 and the upper part 24 are arranged one above the other. The central part 26 is immovable, while the upper part 24 and the lower part 28 are movable relative to the central part 26.

The upper part 24 and the lower part 28 are firmly connected to each other and by means of a rolling bearing are rotatable about an axis of rotation by an angle up to 1.2°. FIGS. 2a to 2c show the upper and lower parts 24 and 28 after a rotation in the end position corresponding to the correct processing position of the workpiece.

The upper part 24 and the lower part 28 have lateral contact surfaces 29, on which the workpiece can be docked during positioning, as can be seen in FIGS. 2a and 2b. In FIG. 2c, the upper part 24 in the end position thereof, the central part 26 and two protruding contact surfaces 29 of the lower part 28 can be seen in the end position thereof. The latter means that the central part 26 in the region of the contact surfaces 29 of the lower part 28 is set back relative thereto by 1 mm. Outside the area of the contact surfaces 29 of the lower part 28, this is set back relative to the central part 26 by 1 mm.

The upper, central and lower parts 24, 26 and 28 each have a lateral recess 31, 32, or 33, which serves to receive a corner of the workpiece to be positioned and/or to fix it. The lateral surfaces of the lower and central part 24, 26 have an identical contour in the area of the contact surfaces 29 and the recesses 33 and 32. The upper part 24 is smaller than the central part 26 and forms an offset in the end position relative to the central part 26. Thus, the upper side of the central part 26 may serve as a bearing surface 38 for the workpiece when it is docked to the upper part 24. The central part 26 also has towards the upper part 24, i.e. in the present case at the edge to the bearing surface 38 thereof, a chamfer of 1×30°, as can be seen in FIG. 2a. The recess 31 of the upper part 24 has such a contour of the side surface that the recess 31 is larger than the recesses 32, 33 of the central and lower part 26, 28.

The upper and the lower side of the central part are provided with a DLC coating. The DLC coating is an amorphous carbon layer with a layer thickness of 3 μm, a hardness of 25 GPa, and is applied with PVD (physical vapour deposition).

As a result, the friction between the central part 26 and the upper and lower parts 24 and 28 is reduced during the rotation thereof. The central part 26 is also protected from damage.

On the lower side of the central part 26, a blocking element 34 is provided, as can be seen in FIG. 2b. The blocking element 34 is at least partially wedge-shaped in the present example, and is therefore referred to below as a wedge. The wedge 34 is mounted in the present example in such a way that it blocks the movement and/or rotation of the lower part 28 and thus also of the upper part 24 in the end position. Thus, depending on the workpiece to be processed, the correct processing position can be adjusted by appropriately positioning the wedge 34 and adjusting the end position. For example, the wedge is adjusted once during set-up of a workpiece processing machine. Thereafter, the correct position of the workpiece for the processing operation can be achieved by positioning the entire finger over machine axes of the workpiece processing machine.

A spring (not shown) is provided on the wedge 34 as a pre-tensioned member in the region of the contact surface to the lower part 28. The spring acts on the lower part 28 and thus also the upper part 24 in the end position thereof with a pre-tensioning in order to release the lower and upper parts 28 and 24 from the end position thereof during operation after the detachment of the workpiece. In an alternative example in which the finger stop 22 is attached to the bracket 23 with a sloping inclination to the horizontal, instead of the preload element, the force of gravity can be used for unscrewing from the end position.

As shown in FIG. 2b, the finger stop 22 is provided with a sensor 36 on the lower part 28. In the present example, the sensor 36 comprises a mechanical switch, which is closed in the end position of the lower part 28 and is opened again when released from the end position. Thus, the sensor 36 can detect the contact of the workpiece with the finger stop 22 and an alignment of the finger stop 22 corresponding to the correct processing position of the workpiece. In addition, with the aid of the sensor, a signal can be triggered and/or generated which indicates to the operator that the correct processing position has been reached.

FIG. 2d shows a lateral cross-sectional view along the line A-A of FIG. 2c in the direction of the arrows 35. In the present example, the upper part 24 and the lower part 28 are firmly connected to each other via a connecting pin 30 and are rotatable by means of a roller bearing 37 provided inside a passage opening 221 of the central part 26. The connecting pin 30 and the passage opening 221 each have circular cross sections in planes perpendicular to the cross-sectional plane illustrated in FIG. 2d. The annular roller bearing 37 is introduced into the passage opening 221 of the central part 26. The upper part 24 includes a circular passage opening 223 which corresponds to the position of the passage opening 221 of the central part. The lower part 28 has a circular passage opening 224 which also corresponds to the position of the passage opening 221 of the central part. The connecting pin 30 is inserted into the passage openings 223 and 224 of the upper and lower part and in the rolling bearing 37 in a form-fitting manner. This results in a firm connection between the upper part 24 and the lower part 28 with simultaneous rotation about the central axis of the connecting pin 30 by means of the roller bearing 37 within the passage opening 221 of the central part 26. The connecting pin 30 may be part of a screw connection connecting the upper part 24 and the lower part 28 in alternative examples.

In the present example, the central part 26 includes a further passage opening 222. The upper part 24 has a connection extension 230 projecting through the passage opening 222 as a connection element which, in the present example, is firmly connected in a form-fitting manner in a corresponding recess of the lower part 28, to the lower part 28. In the present example, the connection extension 230 and the passage opening 222 have circular cross-sections in planes perpendicular to the cross-sectional plane illustrated in FIG. 2d. Within the passage opening 222, the diameter of the connection extension 230 is smaller than the diameter of the passage opening 222. The connection extension 230 is thereby laterally movable within the passage opening 222. The diameter of the connection extension 230 and the diameter of the passage opening 222 are selected such that the upper part 24 and the lower part 28 are rotatable about the central axis of the connecting pin 30 about a maximum angle of 1.2°. As a result, the movement of the upper part and of the lower part with respect to the central part is buffered in the passage opening 222, i.e. the upper part and the lower part can be rotated relative to the central part only about a maximum angle of 1.2°. In the present example, the passage opening 222 with the connection extension 230 and the passage opening 221 with the connecting pin 30 are spaced apart from each other so that the recesses 31, 32 and 33 are positioned therebetween. The connection extension 230 may be part of a screw connection connecting the upper part 24 and the lower part 28 in alternative examples.

In operation, for example, an operator applies a metal sheet as the workpiece to the finger stop 22. The metal sheet is docked to the finger stop 22 in a bearing direction. In the present example, the finger stop 22, i.e. the upper, central and lower parts thereof, is aligned horizontally, and the upper part is arranged above the central part, which in turn is arranged above the lower part. The bearing direction extends in a horizontal plane, i.e., the flat metal sheet is docked horizontally to the finger stop 22. In alternative examples, the finger stop 22 and the bearing direction may be oriented at an angle to the horizontal plane.

In a first docking procedure, the metal sheet is docked onto the contact surfaces 29 of the upper part 24, which is in a position rotated clockwise by 1.2° from the end position shown in FIG. 2a. The metal sheet comes to lie on the bearing surface 38 of the central part 26. By pushing the metal sheet in the direction of the bracket 23, the upper part 24 and thus also the lower part 28 is rotated in the counter-clockwise direction into the end position. The switch of the sensor 36 shown in FIG. 2b is thereby closed and thus the correct end position of the workpiece at the stop 20 is detected.

In a modification of the first docking procedure, a metal sheet is docked onto the contact surfaces 29 of the lower part 28 instead of the contact surfaces 29 of the upper part 24. By pushing the sheet in the direction of the bracket 23, the lower part 28 and thus also the upper part 24 is rotated in the counter-clockwise direction into the end position. The switch of the sensor 36 shown in FIG. 2b is thereby closed. Since the lower parts 28 are larger than the upper parts 24, in this modification, the correct processing position of the metal sheet can be determined with smaller dimensions than in the first docking procedure.

In a second docking procedure, when the workpiece is docked to the finger stop 22, the left rear corner of the metal sheet is inserted into the recess 31 of the top part. To fix the metal sheet another, mirror-inverted finger stop 22 (not shown) is used, which is positioned according to the dimensions of the metal sheet to be processed. The right rear corner of the metal sheet is inserted into the recess 31 of the mirror-inverted finger stop. By pushing the metal sheet in the direction of the brackets 23, the respective upper parts 24 and lower parts 28 of the finger stops 22 are rotated to the respective end positions. The metal sheet comes to lie on the bearing surfaces 38 of the central parts 26. The switches of the sensors 36 are closed. Thus, not only is the correct end position of the workpiece determined at the stops, but the metal sheet is also fixed in the machine in all directions.

In a modification of the second docking procedure, the corners of the metal sheet are introduced into the recesses 33 of the lower parts 28 of the finger stop 22 and the mirror-inverted finger stop 22 instead of into the recesses 33 of the upper parts 24. By sliding the metal sheet in the direction of the brackets 23, the respective lower parts 28 of the finger stops are rotated into the respective end positions and the switches of the sensors 36 are closed. Since the recesses 33 of the lower parts 28 are smaller than the recesses 31 of the upper parts 24, in this modification, a metal sheet of smaller dimensions than in the second docking procedure can be brought into the correct processing position thereof and fixed there.

According to further examples, the sensor(s) 36 is/are connected to a signal output device and in the first docking procedure trigger(s) a signal that can be directly perceived by the operator from his/her working position, e.g., a beep, after closing the switch. In other examples, in the second docking procedure described above, the signal is only triggered and/or generated when both switches of the two workpiece stops are closed and both corners of the metal sheet are fixed. In this way, the operator can take note of the signal about the correct processing position and/or the correct fixation of the sheet without changing his/her working position.

Signal Output Device

As described above, in one embodiment, a signal output device is provided for outputting a signal directly perceptible to an operator of a workpiece processing machine from his/her working position, including a vibration generating unit for generating and transmitting a vibration to an operating element of the workpiece processing machine as the signal. Thus, the ease of use, process reliability and processing speed of a workpiece processing machine which is equipped with the signal output device is optimised. The vibration generating unit can generate a vibration of high frequency and small amplitude. The vibration may, for example, have a frequency of 30 to 800 Hz and an amplitude of 1 to 10 mm, and further may be output continuously or discontinuously, for example, at intervals. The frequency and/or the amplitude may be constant or variable.

The operator can remain in contact with the control element or a part thereof from his/her working position. In this way, the immediate recognition of the vibration signal is promoted.

The vibration generating unit may be configured such that it can be coupled to the operating element in a vibration-transmitting manner. The vibration generating unit may include a mechanical and/or an acoustic vibration generator. For example, an unbalance motor may be provided as a mechanical vibration generator. The unbalance motor, for example, may be mechanically connected to the control element and thus transmit the vibrations. A speaker membrane which generates the vibration at low frequencies can serve as an acoustic vibration generator.

Furthermore, the operating element may include or be one or more elements selected from a foot pedal, a floor mat, a handle, a remote control, a glove, a shoe, a watch, a mobile phone, in particular a mobile phone with an operating element app, a pair of headphones, a pair of glasses, in particular a pair of virtual reality glasses, a control panel, and any combination thereof. The operating element may include a plurality of similar elements, for example two foot pedals. The control may comprise a smart watch as a watch, for example. In this case, the signal output device may be formed for wired or wireless reception of a vibration triggering control command.

The signal output device can be operated with a computer program, in particular from the embodiments. The computer program can be designed in particular for controlling the signal output. For example, the computer program can control which events (correct or faulty processing position) trigger a signal generation. In addition, the type of signal output (e.g., vibration) and a receiver module for the signal (see above: glasses, foot pedal, shoe, etc.) can be determined.

Due to the immediate perception of the output vibration signal, the operator does not need to change his/her working position to perceive the signal. The vibration signal is directed only to the current operator of the relevant workpiece processing machine, so that confusion with other machines or equipment can be avoided. The signal may indicate an operating state of the workpiece processing machine, such as an error, the achievement of a production target, a contact of a workpiece with a workpiece stop, a correct processing position of a workpiece and/or a correct fixation of a workpiece. In this case, different vibration signals can be used for different operating states, which differ, for example in vibration frequency and/or in vibration intensity. In addition, the vibration signal may indicate the simultaneous presence of multiple operating situations, for example contact of a workpiece with a workpiece stop and a correct processing position of the workpiece. Thus, the ease of use, the process reliability and the processing speed of a workpiece processing machine in which the signal output device is installed are promoted.

Figure 3:
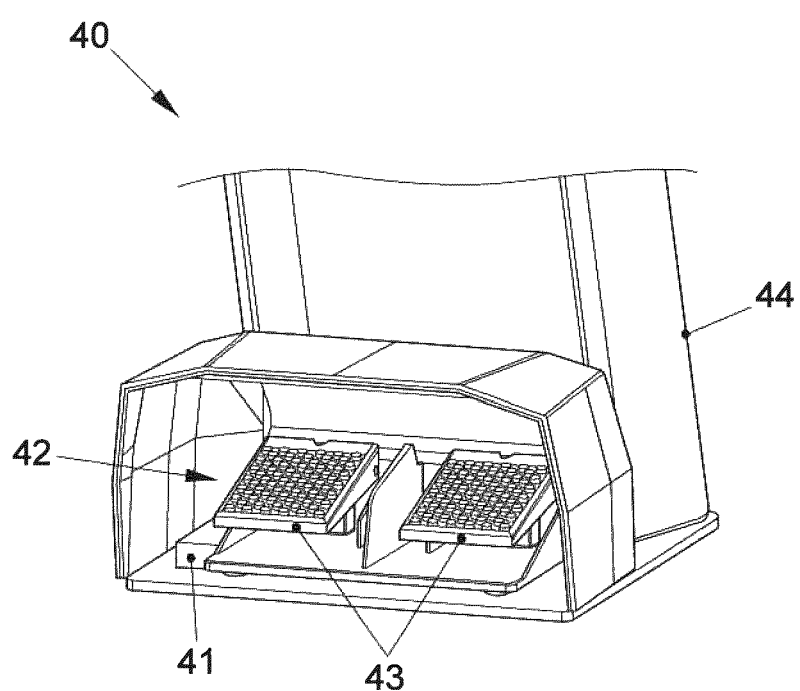
FIG. 3 shows a schematic and perspective view of an example of a signal output device according to the invention.

Operating states that can be displayed by different vibrations can be, for example, a correct or a faulty workpiece position or workpiece positioning still to be performed. Furthermore, an impending, new positioning task of the workpiece currently being processed or the insertion of a completely new workpiece can be displayed. Likewise, by means of one, several or different vibrations the following can be indicated: the end of the task, the running out of a material, a faulty workpiece, an incorrect tool, an opened safety gate, or a break. In this case, normal machine conditions (i.e. simple information about the machine) can cause comparatively slight vibrations, while fault states or even dangers can be indicated by a strong vibration. Similarly, machine states can be differentiated by the sequence of vibrations (similar to Morse code). For example, correct workpiece positioning may result in continuous vibration, while faulty positioning can be indicated by a pause of 0.5 s following a vibration of 1 s. These examples can be combined as desired. Particularly dangerous situations can be combined with a warning sound and/or the lighting up of a colour display of a control element. FIG. 3 shows schematically and in perspective an example of a signal output device 40 according to the invention, in which an unbalance motor 41 is provided as the vibration generating unit. In the present example, the unbalance motor 41 is coupled to a control element 42 of a bending machine, with which a metal sheet can be bent as a workpiece, for transmitting a vibration as a signal for a correct metal sheet position. The unbalance motor 41 is anchored to the housing of the control element 42, so that the unbalance motor 41 and the control element 42 are mounted as close to each other as possible. The unbalance motor 41 is set to generate an amplitude of 1 mm at a rotational speed of 3000 rpm as the vibration signal a vibration having a frequency of 50 Hz.

The control element 42, to which the vibration signal is transmitted, comprises two foot pedals 43 of a control panel 44 of the bending machine. The foot pedals 43 are each attached in the control element 42 with a hinge and each provided with a pedal encoder. The pedal encoder communicates to a control of the bending machine the operational preference of the operator corresponding to a pedal position. In the present example, during operation of the bending machine, the operator may use his/her foot to operate the left or right foot pedal 43 to initiate a lowering of the upper beam by adjusting the pedal position.

The unbalance motor 41 has a receiving unit (not shown) with which a control command for triggering the vibration signal can be received wirelessly. In the present example, the control command is issued when the sheet is arranged at a rear stop of the bending machine.

At the beginning of the bending process, before the operator introduces the metal sheet to be processed into the bending machine, the upper beam is arranged in the initial position thereof, for example at maximum height. The operator introduces the metal sheet into the machine, namely into the space between the top and bottom beams. The operator places his/her foot on the left or right foot pedal 43 now or even before the insertion of the metal sheet. The operator moves the metal sheet until it is arranged on the rear stop. A sensor detects that the metal sheet is positioned on the rear stop and transmits directly or via the control of the bending machine a corresponding control command to the receiving unit of the unbalance motor. As a result, the vibration of the control element 42 is triggered with the foot pedals 43 therein. Thus, the operator receives information via his/her foot through a signal that can be directly perceived from his/her working position that the metal sheet is in contact with the rear stop and can be processed. He/she will now adjust the foot pedal position and thus move the upper beam down to bend the sheet. Once the bending process is completed, the operator returns the left foot pedal 43 to the original position thereof and the upper beam moves up. The operator removes the metal sheet from the rear stop and the vibration of the control 42 is terminated. Alternatively, the vibration may already be terminated when the upper beam command is issued.

Additionally and/or simultaneously to the vibration signal, an optical signal can be output on a screen of the control element. Alternatively, the entire control panel 44 may vibrate.

In further embodiments, the signal output device may be combined with a workpiece stop comprising at least one finger stop which can be at least partially aligned according to an embodiment as described above. Thus, the operator can monitor not only a contact of the workpiece with the workpiece stop but also, in particular simultaneously, a position of the workpiece in the workpiece processing machine, in particular a correct processing position and/or a correct fixation of the workpiece, without changing his/her working position.

For example, if the signal output device shown in FIG. 3 is combined with the workpiece stop comprising the at least partially aligned finger stop as a rear stop in the workpiece processing machine, the operator does not need to avert his/her gaze from the metal sheet before or during the bending process to control the processing position, and the concentration of the operator is not affected. The working position of the operator and the operation procedure are not interrupted because the foot of the operator always remains resting on the left or right foot pedal 43. Thus, immediately after perceiving the vibration signal on the foot pedal 43, he/she can initiate the stroke of the upper beam at the correct processing position and/or correct fixing of the sheet by pressing the foot pedal 43.

Imaging Device

A further embodiment relates, as explained above, to an imaging device for generating at least one image of the interior of a workpiece processing machine, in particular a workpiece processing machine with an interior which is not or is only incompletely visible for an operator from his/her working position. The imaging device includes an image capturing unit configured to capture at least one image of the inside of the machine or a part of the interior. The imaging device has an image display unit configured to display the at least one image. At least one element selected from the image capturing unit and the image display unit is configured to present the image substantially corresponding to a virtual perspective of the operator of the interior of the machine from his/her working position. In this way, an image can be generated and presented to the operator which reproduces the interior of the workpiece processing machine substantially in the virtual perspective of the operator. The virtual perspective of the operator in the embodiments is the perspective of the inside of the machine that the operator would see in a working position if the workpiece processing machine on the operator side were to have transparent components, e.g., a transparent upper beam. This promotes the quality of working conditions for the operator and the ease of use, process reliability and processing speed of a workpiece processing machine which is equipped with the imaging device.

The image capturing unit and the image display unit may be connected to each other via one or more data-conducting connections and/or via one or more data-processing controllers, in particular via a controller of the imaging device. The image capturing unit and/or the image display unit can be controlled by a computer program, in particular from the embodiments. The one or more connections can be implemented independently of each other wirelessly and/or wired.

The term "virtual perspective of the operator of the interior of the machine from his/her working position" may include a constant and/or a variable virtual perspective. Firstly, in the embodiments, the image of the machine interior may be presented substantially corresponding to a constant perspective of the operator that does not change as the operator's working position changes. In particular, the image captured and/or displayed in the embodiments may be presented constantly in the perspective that the operator adjusts and/or that corresponds to one of his/her working positions, for example the working position at the start of the workpiece processing process. Alternatively or additionally, in the embodiments, the image of the machine interior may be presented substantially according to a variable perspective of the operator, which changes as the operator's working position changes.

The imaging device can further include a unit for detecting the working position of the operator; and/or a projection unit configured to project a mark of a correct processing position of a workpiece to be processed into the inside of the machine. The unit for determining the working position of the operator enables an automated generation of the virtual perspective of the operator. For example, an eye tracker or the like may be employed as the unit for determining the working position of the operator. The determining the working position can be continuous or discontinuous. With the projection unit, the optimal or correct workpiece position can be projected into the inside of the workpiece processing machine, thus guiding the operator through the processing operation. For example, a laser can be attached to the image capturing unit, for example on a camera, with which the desired workpiece contour is projected onto the region of the interior of the machine in which the workpiece is to be positioned.

The image capturing unit can include at least one mirror, in particular an adjustable mirror, for mirroring the interior of the machine and/or at least one camera for capturing at least one image of the mirrored interior.

The mirror may be adjustable in height and/or inclination relative to the vertical, for capturing the at least one image of the mirrored interior corresponding to the operator's virtual perspective of the interior of the machine from his/her working position. The mirror can be adjusted manually and/or by means of control commands by the operator. Alternatively or additionally, the mirror may be automatically adjustable. For example, the mirror may include a bracket that includes an adjustable adjustment mechanism, particularly with respect to the height and/or inclination of the mirror. The adjustment mechanism can be adjusted manually by the operator, e.g., with a set screw, and/or by the operator via control commands. Alternatively or additionally, the adjustment mechanism may be automatically adjustable. For example, the adjustment mechanism may be connected to the unit for determining the working position of the operator. The unit for determining the working position of the operator can determine his/her working position, e.g., the position of his/her eyes. The unit for determining the working position of the operator may be designed to output control commands to the adjustment mechanism. The control commands can be output directly or via a controller to the adjustment mechanism. Thus, by adjusting the mirror, the at least one image of the mirrored interior can be detected substantially corresponding to the virtual perspective of the operator of the interior of the machine from his/her working position.

The camera of the image capturing unit may be a video camera. The camera can furthermore be retractable into a recess of a component of a workpiece processing machine, for example into an axle body of a rear stop. As a result, damage to the camera can be avoided during operation of the workpiece processing machine. The camera may be adjustable at an angle to the horizontal and/or vertical. In particular, the camera can be set to different image sections. Several cameras can be provided in order to be able to capture several image sections at the same time. The camera can be designed and/or provided to be movable in the horizontal and/or vertical. The camera may include an autofocus and/or a reticle, e.g., a crosshair for adjustment.

In the embodiments of the imaging device, the at least one camera and the at least one mirror may be arranged such that the camera(s) capture(s) the image captured in the mirror(s). For this purpose, the at least one camera can be aimed directly at the at least one mirror. In particular, the at least one camera can respectively be directed onto the mirror(s) in such a way that it captures itself and/or an object to be recorded. One or more cameras can be combined with one or more mirrors. The size of the mirror may be selected according to the image to be captured. The mirror may have a marker, e.g., a crosshair, for focusing the camera image. For example, the marker may be provided in the mirrored field of view of the camera to facilitate the automatic focusing of the image.

The image display unit may be a display device for displaying images, in particular video images. For example, an OLED (organic light-emitting diode), a flat screen, a projection display or a tablet may be provided. An OLED is particularly preferred since it is flat and can be attached to a workpiece processing machine, in particular to a top beam of a bending/folding machine, without restricting the processing spectrum. The size of the display of the display device can be the size of the image to be displayed or adjusted. The size of the display can correspond at least to the area detectable by the at least one camera. Furthermore, the size of the display may correspond or be adapted to the dimension of the image section expected by the operator. In the examples, the indicator may have a size corresponding to the entire area of a top beam of a workpiece processing machine. In particular, the height of the display device can correspond to the stroke range of the upper beam.

The image display unit can include or is or can be connected to a computing unit, e.g., a control, for converting the at least one image of the mirrored interior according to the virtual perspective of the operator to the inside of the machine from his/her working position. In this way, the image can be adapted in a computerised manner to the virtual perspective of the operator of the inside of the machine from his/her working position and/or at least be partially generated as a simulation of the virtual perspective of the operator of the inside of the machine from his/her working position. The controller may be a controller of the imaging device or the workpiece processing machine.

For example, an image of the interior of the machine, which is generated by taking a mirror image and reflects the reality mirrored, can be converted by means of the computing unit to faithfully reproduce the interior of the machine. In addition, images captured by multiple cameras can be combined into a single image for display or fused into a combined image. Furthermore, a method of an object to be captured, such as finger stops and/or z-axes of a workpiece processing machine, and/or a method corresponding to the camera(s), respectively, can be displayed on the image display unit. If, for example, the object to be captured in the interior of the machine is positioned in the left-hand area of the interior, the associated image section is also displayed at the corresponding position of the display of the display device.

In addition, computer-supported contact surfaces of a workpiece stop can be calculated and inserted into the generated image, e.g., highlighted using colour, in order to guide the operator through the processing process. These calculations can be performed by a computer program, in particular from the embodiments, and thus be automatic. Furthermore, by means of the computing unit, a colour-emphasised virtual workpiece contour can be displayed at the optimum processing position in the generated image so that the operator can compare it with the real contour and the real position of the workpiece introduced into the machine. This avoids incorrect positioning.

For the computational operations, e.g., the computation of the optimal/correct processing position of the workpiece, data from measuring systems present in a workpiece processing machine, e.g., from z-axis measuring systems, can be used. For this purpose, the computer program can exchange data with the systems mentioned via corresponding network connections.

Furthermore, in the case of a large field of view of the camera, only a smaller image detail, e.g., a detail containing a finger stop, can be displayed. For example, by means of optical markings, such as a colour of the object to be displayed, only the object can be displayed by hiding the surroundings. Furthermore, the displayed image detail can be reproduced by taking into account the known position of the object to be displayed on a scale of 1:1. This allows the image to be enlarged or reduced to represent the object realistically. These image representation computations can be performed by the computer program.

One embodiment further relates to a computer program for use in the computing unit for performing the associated operations, e.g., as described above. Thus, another embodiment relates to a computer program for operating an imaging device according to any one of the embodiments when the computer program is executed on the imaging device.

Figure 4B:
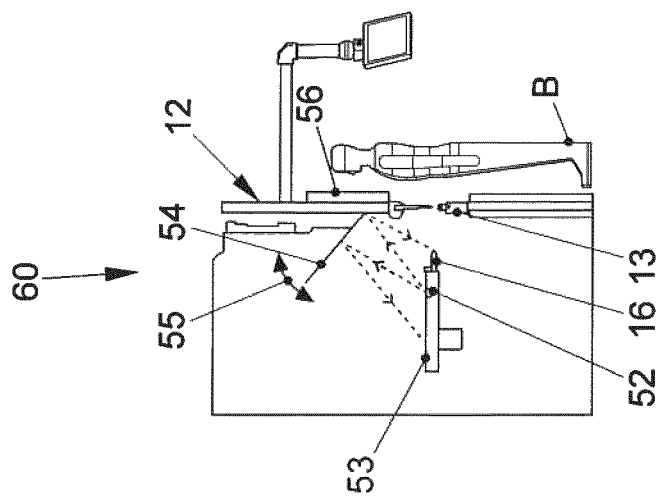
FIGS. 4a to 4d show schematic and partial perspective views of examples of an imaging according to the invention.
Figure 4A:
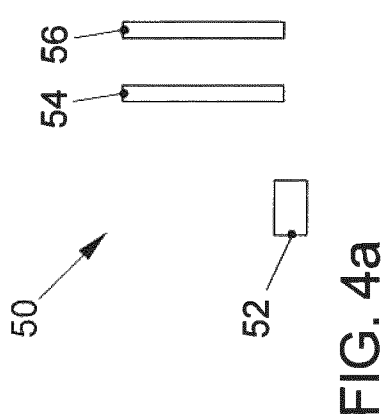

FIG. 4a schematically shows an example of an imaging device 50 according to the invention. The imaging device 50 includes a camera 52 and a mirror 54 as an image capturing unit, and an OLED 56 as an image display unit.

FIG. 4b schematically illustrates a side cross-sectional view of another example in which the imaging device 50 is installed in a bending machine 60, in front of which an operator B is from his/her working position. The camera 52 is installed in a recess of an upper side of a movable z-axis body 53 of the machine. A finger stop 16 also designed as a rear stop is attached on the z-axis body. The mirror 54 is provided at the eye level of the operator B on the inside of the machine 60 and can be adjusted horizontally in the inclination thereof (arrow 55). The camera 52 is directed to the mirror 54. The OLED 56 is mounted on the outside of the machine 60 on the upper beam 12 in the initial position thereof at the eye level of the operator B and moved together with the upper beam. The width of the mirror 54 and the OLED 56 respectively correspond to the entire z-travel range of the z-axis body 53.

Figure 4D:
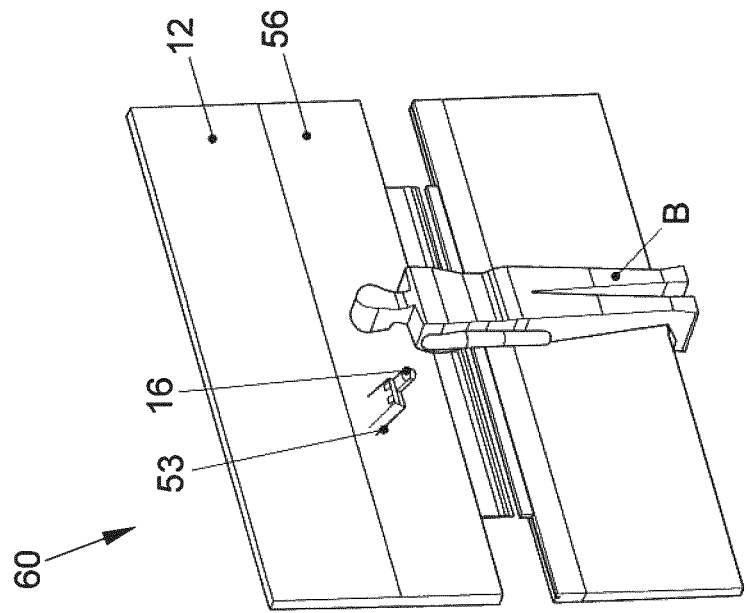
Figure 4C:
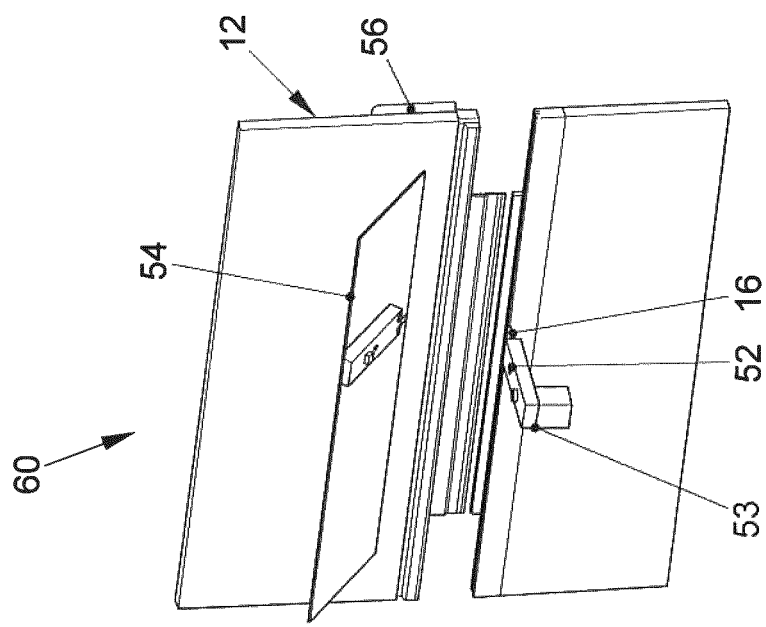

In operation of the bending machine 60, at the beginning of the bending process, i.e. before the operator introduces the metal sheet to be processed into the bending machine, the upper beam 12 is arranged in the initial position thereof, e.g., at maximum height. The operator manually horizontally adjusts the inclination of the mirror 54 so that the finger stop 16 is mirrored in the mirror 54, as shown in FIG. 4*c* in a partial perspective view. The mirrored finger stop 16 is detected by the camera 52 and is correspondingly visible on the OLED 56 of the virtual perspective of the operator, as FIG. 4*d* shows in a perspective partial view. In this way, the operator is given the impression of a transparent upper beam, through which he/she can look.

The operator B introduces the metal sheet into the space between the upper beam 12 and lower beam 13. The operator B moves the metal sheet until it is arranged on the finger stop 16. On the OLED 56, the operator B can track the movement of the metal sheet and detects when the metal sheet is in contact with the finger stop 16 and can be processed. He/she now moves the upper beam 12 together with the OLED down to bend the sheet. Once the bending process is completed, the operator moves the upper beam 12 back up. The operator now removes the bent metal sheet from the finger stop 16.

In a variation of this example, the OLED 56 is mounted on an outer panel of the bending machine 60 at the eye level of the operator B instead of on the upper beam 12 and it is not moved together with the upper beam 12 during operation.

Embodiments of the imaging device thus enable the optical support of the process of positioning the workpiece. This can be realised by means of an image capturing unit which contains one or more cameras in the region of the z-axes of a rear stop of a workpiece processing machine. The camera(s) can be lowered at an angle into the axle body(ies) in order to avoid damage. The connection of the camera(s) to the movable z-axis facilitates automatic positioning of the camera(s). The at least one mirror can be mounted inside the machine at the height of the upper beam, for example on the rear side or on an inner lining. The at least one mirror can be adjusted in the height and in inclination thereof to the vertical by the operator. The at least one mirror may extend in the width thereof over the entire z-travel range of the z-axes. The adjustment of the mirror can be carried out manually or automatically, based on the physical conditions and preferences of the respective operator. The angled camera(s) can be directed directly at the at least one mirror, so that an image of the camera(s) and of the respective rear stop with finger stops is generated. The image obtained, through the height and position of the at least one mirror, substantially corresponds to the user's perspective from his/her working position, which he/she would see if the upper beam were transparent or absent. In this case, the mirror or the combination of the mirrors can have a size with which, in the ratio of the camera angle to the mirror(s), in particular any area that can be reached with the finger stops of the rear stop, is visible. The camera(s) can thus capture any position of the rear stop.

Furthermore, the optical assistance of the positioning operation of the workpiece can be realised by means of an image display unit having a display device, e.g., a screen, mounted outside on the operator side of a workpiece processing machine. The indicator can be provided at the level of the upper beam, for example, directly on the upper beam or on an outer panel. The position of the display device can be adapted to the physical requirements of the operator, e.g., height. The display device, in particular the display thereof, may extend in the width and height thereof over the entire upper beam, but at least according to the possible horizontal and/or vertical travel range of the camera(s). The height of the display device can be selected so that different operator sizes and/or the stroke range of the upper beam, preferably without height adjustment, are covered. The height and width of the display device, in particular the display thereof, can also be selected so that the objects to be displayed, for example the areas of the rear stop and/or the finger stops of the workpiece processing machine, are completely displayed in the dimension expected by the operator. The expected dimension may result from the distance of the objects, e.g., finger stops, to the operator and/or may be automatically adjusted as the objects move to convey a direct image to the operator. This means that the further the objects to be displayed are removed from the processing line, e.g., bending line, the smaller the image can become. This gives the operator the impression that he/she can look through the operator side of the machine, e.g., through the upper beam.

Device for Monitoring a Processing Position of a Workpiece

In one embodiment, a device for monitoring a processing position of a workpiece is provided in a workpiece processing machine, in particular a bending press and/or press brake. The device for monitoring a processing position of a workpiece contains at least one element selected from a workpiece stop according to any one of the embodiments; a signal output device according to any one of the embodiments, and an imaging device according to any one of the embodiments. The workpiece stop, the signal output device and/or the imaging device may be connected to each other via one or more data-conducting connections and/or via one or more data-processing controllers, in particular via a controller of the device for monitoring a processing position. The one or more connections can be implemented independently of each other wirelessly and/or wired.

The device for monitoring a processing position of a workpiece in a workpiece processing machine may include a workpiece stop according to any one of the embodiments and a signal output device according to any one of the embodiments, wherein the signal output device is configured to output a signal triggered by the at least one sensor of the workpiece stop in the correct processing position of the workpiece.

Figure 5:
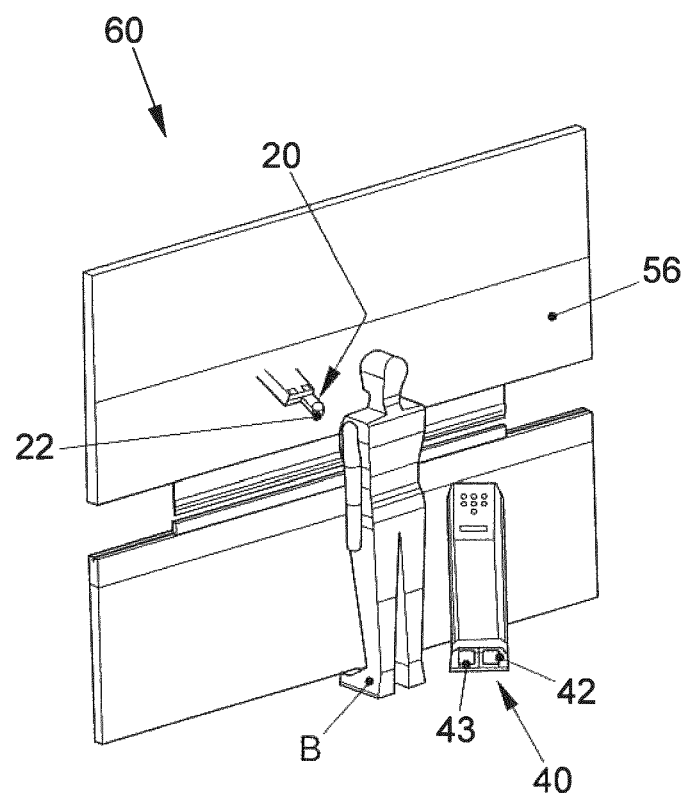
FIG. 5 shows a schematic and perspective view of an example of a device for monitoring a processing position of a workpiece according to the invention.

FIG. 5 shows a schematic and perspective view of an example of a device according to the invention for monitoring a processing position of a workpiece. In the example of FIG. 5, the device for monitoring a processing position of a workpiece is installed in the bending machine 60 of FIGS. 4*b* to 4*d*. The present example comprises the workpiece stop 20 with a finger stop 22, the signal output device 40 and the imaging device 50. That is, in the machine 60, instead of the finger stop 16, a finger stop 22 according to the example of FIGS. 2*a* and 2*b* is installed. As shown in FIG. 5, the workpiece stop 20 and thus the finger stop 22 is reproduced in the OLED 56 of the imaging device 50 on the outside of the machine at the level of the eyes of the operator B. Furthermore, the signal output device 40 of the example of FIG. 3 is arranged to the side of the operator. The workpiece stop 20, the signal output device 40 and the imaging device 50 are connected via a controller of the machine 60.

In operation, at the beginning of the bending operation, i.e., before the operator B, for example, introduces a metal sheet to be processed into the bending machine 60, the upper beam 12 is arranged in the initial position thereof, for example at maximum height. The operator manually adjusts the inclination of the mirror 54 horizontally so that the finger stop 16 is mirrored in the mirror 54, captured by the camera 52 in mirror image, and displayed on the OLED 56 corresponding to the operator's virtual perspective. The operator B introduces the metal sheet into the space between the upper beam 12 and lower beam 13. Before or after the introduction of the metal sheet, the operator B steps on the left foot pedal 43 of the signal output device 40. The operator B moves the metal sheet until it is arranged on the finger stop 22 of the workpiece stop 20. On the OLED 56, the operator B can track the movement of the metal sheet and detect when the metal sheet is in contact with the finger stop 22.

According to the first docking procedure described above, the metal sheet is docked to the contact surfaces 29 of the upper part 24 of the finger stop 22, which is in a position rotated clockwise by 1.2° from the end position shown in FIG. 2a. The metal sheet comes to lie on the bearing surface 38 of the central part 26. By pushing the metal sheet in the direction of the bracket 23, the upper part 24 and thus also the lower part 28 are rotated in the counter-clockwise direction into the end position. The switch of the sensor 36 shown in FIG. 2b is closed and thus the correct end position of the workpiece at the workpiece stop 20 is detected. Thus, a control command is output to the unbalance motor of the signal output device 40.

Due to the control command, the unbalance motor is put into operation and the vibration of the operating element 42 and the foot pedal 43 is triggered. Thus, the operator receives the information that the metal sheet is arranged on the finger stop 22 in the correct end position and can be processed by a vibration signal which can be perceived directly at his/her foot from his/her working position. He/she will now adjust the foot pedal position and thus move the upper beam 12 down to bend the sheet. Once the bending process is completed, the operator returns the left foot pedal 43 to the original position thereof and the upper beam 12 moves up. The operator removes the metal sheet from the finger stop 22 and the vibration of the control 42 is terminated.

Other examples relate to modifications of the above-described example of the device for monitoring a processing position of a workpiece in which only one or two elements selected from the workpiece stop 20, the signal output device 40 and the imaging device 50 are implemented.

In a further embodiment, a device for monitoring a processing position of a workpiece according to any one of the embodiments is used in a bending press and/or press brake.

Workpiece Processing Machine

Another embodiment relates to a workpiece processing machine, in particular a workpiece processing machine with an interior which is not or is only incompletely visible for an operator from his/her working position, in particular a bending press and/or press brake. The workpiece processing machine comprises at least one element selected from a workpiece stop according to any one of the embodiments; a signal output device according to any one of the embodiments, and an imaging device according to any one of the embodiments. The workpiece stop, the signal output device and/or the imaging device may be connected to each other via one or more data-conducting connections and/or via one or more data-processing controllers, in particular via a controller of the workpiece processing machine. The one or more connections can be implemented independently of each other wirelessly and/or wired.

The workpiece processing machine may include an imaging device according to any one of the embodiments including the image capturing unit with at least one mirror for mirroring the interior of the machine and at least one camera for capturing at least one image of the mirrored interior, wherein the mirror is arranged on an inside of the machine of the operator's virtual perspective of the interior of the machine corresponding to his/her working position, the camera is aligned with the mirror, and the image display unit is arranged on an outside of the machine of the virtual perspective of the operator on the inside of the machine from his/her working position.

In the embodiments in which the mirror and/or the image display unit are arranged according to the "virtual perspective of the operator of the interior of the machine from his/her working position", the mirror and/or the image display unit can be arranged on the inside or the outside the machine substantially corresponding to a constant and/or a variable virtual perspective of the operator and/or be movable. For example, the mirror and/or the image display unit may be statically arranged on the machine according to the constant perspective in the working position of the operator at the beginning of the workpiece processing process. In examples in which the image display unit is arranged on a moving upper beam, the image display unit may be statically arranged on the upper beam in correspondence with the constant perspective of the operator's working position at the beginning of the workpiece processing process and can move with the upper beam. Alternatively or additionally, the arrangement of the mirror and/or the image display unit on the machine can be dynamically changed at least partially corresponding to a changed working position of the operator.

In the workpiece processing machine, the inside of the machine can comprise at least one stop selected from a workpiece stop, a workpiece rear stop, and a workpiece stop according to any one of the embodiments; and the imaging device can be formed to capture an image of the stop.

The workpiece processing machine may include a workpiece stop according to any one of the embodiments and a signal output device according to any one of the embodiments, wherein the signal output device is configured to output a signal triggered by the at least one sensor of the workpiece stop in the correct processing position of the workpiece.

The workpiece processing machine may therefore include a device for monitoring a processing position of a workpiece in a workpiece processing machine according to the embodiments, due to the included workpiece stop, the signal output device and/or the imaging device.

Figure 6:
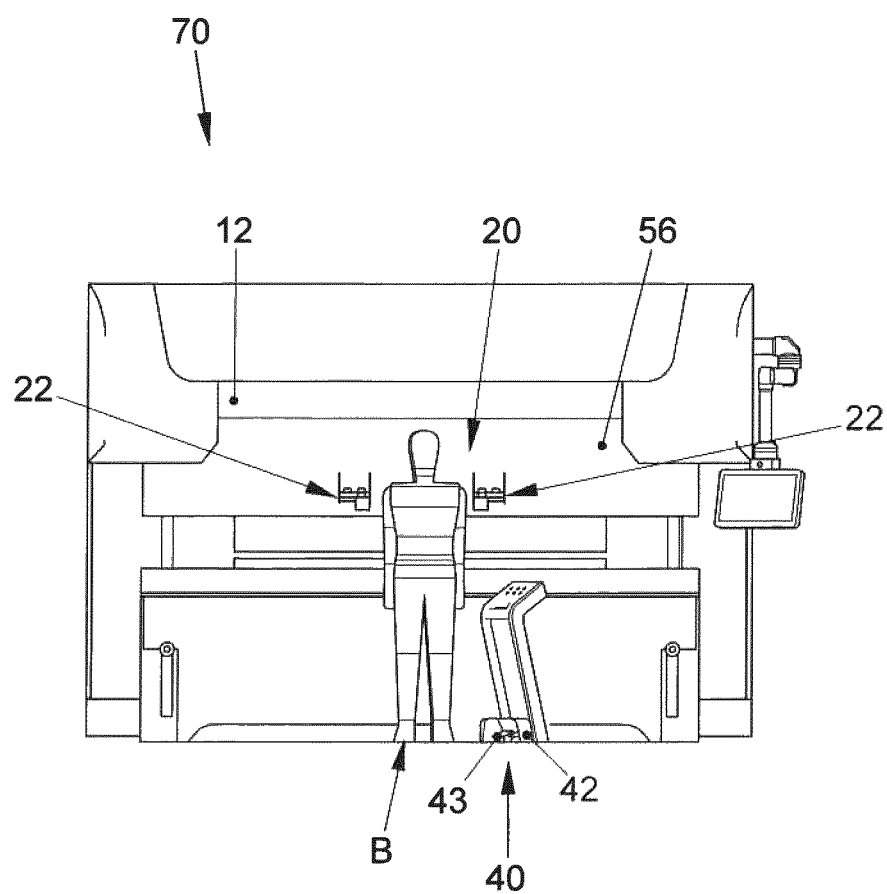
FIG. 6 shows a schematic side view of an example of a workpiece processing machine according to the invention.

FIG. 6 schematically shows the operator side of an example of a workpiece processing machine according to the invention which is designed as a bending machine 70. In the example of FIG. 6, the bending machine 70 includes the workpiece stop 20 with two finger stops 22, the signal output device 40 and the imaging device 50 with two cameras 52.

That is, in the machine 70, the device for monitoring a processing position of a workpiece is installed as in the bending machine 60 of FIG. 5, with the differences that provided in the present example are two finger stops 22 instead of one finger stop 16 and two cameras 52 instead of one camera 52. The two finger stops 22 and the two cameras 52 are installed on two z-axis bodies 53 arranged next to each other and movable along the z-axis. That is, one finger stop 22 and one camera 52 are mounted per z-axis body 53. In this case, the right finger stop 22 is formed to be mirror-inverted to the left finger stop 22, which corresponds to the example of FIGS. 2a and 2b.

As shown in FIG. 6, the finger stops 22 in the OLED 56 of the imaging device 50 are reproduced on the outside at the eye level of the operator B. Furthermore, the signal output device 40 of the example of FIG. 3 is arranged to the side of the operator. The workpiece stop 20, the signal output device 40 and the imaging device 50 are connected via a controller of the machine 70.

The operation of the bending machine 70 is similar to that of the above-described bending machine 60, with the differences that the metal sheet is docked not only to the left finger stop 22 but also to the right finger stop 22 and the image displayed on the OLED 56 is generated as a combination of image sections captured by the cameras 52. The docking corresponds to the above-described second docking procedure. In this case, when the workpiece is docked onto the left finger stop 22, the left rear corner of the metal sheet is inserted into the recess 33 of the top part. To fix the metal sheet, the right finger stop 22 is used. The right rear corner of the metal sheet is inserted into the recess 33 of the right finger stop 22. By pushing the metal sheet in the direction of the brackets 23, the respective upper parts 24 and lower parts 28 of the finger stops 22 are rotated to the respective end positions. The metal sheet comes to lie on the bearing surfaces 38 of the central parts 26. The switches of the sensors 36 are closed. Thus, not only is the correct end position of the workpiece determined at the finger stops, but the metal sheet is also fixed in the machine in all directions.

In another embodiment, a workpiece processing machine according to any one of the embodiments is used for bending and/or folding a workpiece.

Method for Processing a Workpiece in a Workpiece Processing Machine

One embodiment specifies a method for processing a workpiece in a workpiece processing machine, in particular in a workpiece processing machine with an interior which is not or is only incompletely visible for an operator from his/her working position, in particular in a workpiece processing machine according to any one of the preceding embodiments. The method includes at least one step selected from: contacting the workpiece with at least one finger stop of the machine that can be at least partially aligned and aligning the finger stop according to a correct processing position of the workpiece; generating and transmitting a vibration to an operating element of the machine as a signal; and, receiving at least one image of the interior of the machine and displaying the at least one image on an exterior of the machine, corresponding to and in the position of a virtual perspective of the operator of the interior of the machine from his/her working position. This allows the operator to follow the workpiece processing operation without changing his/her working position. This promotes ease of use, process reliability and the processing speed of the workpiece processing.

In the method, the operating element may be in contact with the operator, be put in contact, or be arranged or will be arranged within reach of the operator, e.g., within acoustic range. Thus, the vibration can be perceived by the operator by means of direct contact or indirectly. The vibration can also be felt by the operator when the operator is in the vicinity of the vibration generator or vibrating control element. For example, the vibration may be transmitted through the environment, e.g., from a vibrating foot pedal across the floor to the foot of the operator. Additionally or alternatively, the operator may acoustically perceive the vibration.

In the method, the vibration of the operating element can indicate the contact of the workpiece with the at least one finger stop and the correct processing position of the workpiece; and/or the at least one image can reproduce the at least one finger stop; and/or the capture can include mirroring the interior of the workpiece processing machine in a mirror arranged to correspond to the virtual perspective of the operator and capturing at least one image of the mirrored interior.

In the method, the capturing can include detecting the mirrored interior, in particular adjusting the mirror at a height and/or inclination relative to the vertical, corresponding to the virtual perspective of the operator of the interior of the machine from his/her working position.

In the method, the displaying can include transforming the at least one image of the mirrored interior corresponding to the virtual perspective of the operator to the interior of the machine from his/her working position; and/or the step of receiving and displaying the at least one image of the interior of the machine can include determining the working position of the operator. In this way, the image can be adapted by computer-aided means and/or automatically to the virtual perspective of the operator on the inside of the machine from his/her working position. For example, an image of the interior of the machine, which is generated by taking a mirror image and thus reflects the reality mirrored, can be converted to faithfully reproduce the interior of the machine. Alternatively or additionally, the image can be generated at least partially as a simulation of the virtual perspective of the operator of the interior of the machine from his/her working position. The determining the working position can be continuous or discontinuous.

Furthermore, in other embodiments of the method, the same functions, docking procedures and/or operations of the workpiece stop, the signal output device, the imaging device, the device for monitoring a processing position of a workpiece, and the workpiece processing machine of the embodiments and examples described above can be implemented individually or in any combination thereof.

Finally, it should be noted that the description of the invention and the exemplary embodiments are not to be understood as limiting in terms of a particular physical realisation of the invention. All features explained and shown in connection with individual embodiments of the invention may be provided in different combinations in objects according to the invention in order to simultaneously realise the advantageous effects thereof.

The scope of the present invention is given by the claims and is not limited by the features illustrated in the specification or shown in the figures.

It is particularly obvious to a person skilled in the art that the invention can be used not only for the processing of workpieces, but also for other production processes to be supervised by operators, which are carried out inside machines with poor visibility.

REFERENCE SYMBOLS

10 Bending machine
12 Upper beam

13 Lower beam
14 Tools
16 Finger stop
17 Control panel
18 Foot pedal
B Operator
20 Workpiece stop
22 Finger stop
23 Bracket
24 Upper part
26 Central part
28 Lower part
29 Contact surfaces
30 Connecting pin
31 Recess of the upper part
32 Recess of the central part
33 Recess of the lower part
34 Wedge
35 Arrows
36 Sensor
37 Roller bearing
40 Signal output device
41 Unbalance motor
42 Control element
43 Foot pedal
44 Control panel
50 Imaging device
52 Camera
53 Z-axis body
54 Mirror
55 Arrow
56 OLED
60 Bending machine
70 Bending machine
221 Passage opening
222 Passage opening
223 Passage opening
224 Passage opening
230 Connection extension

The invention claimed is:

1. A workpiece stop for a workpiece processing machine, comprising,
at least one finger stop having at least one contact surface for a workpiece; and
at least one sensor,
wherein the at least one finger stop can be at least partially aligned for monitoring a contact of the workpiece with the workpiece stop and a correct processing position of the workpiece in the workpiece processing machine, the at least one finger stop having an alignability when docking the workpiece, and
wherein the at least one finger stop is associated with in each case at least one of the sensors and the sensor is designed such that it contacts the workpiece with the finger stop and determines an orientation of the finger stop corresponding to the correct processing position of the workpiece.

2. The workpiece stop according to claim 1, wherein the at least one finger stop is at least partially movably and/or rotatably seated in an end position corresponding to the correct processing position of the workpiece.

3. The workpiece stop according to claim 1, wherein the sensor includes a switch and is designed so as to determine the contact of the finger stop with the switch in the correct processing position of the finger stop.

4. The workpiece stop according to claim 2, including at least one element selected from
at least one blocking element, wherein the at least one finger stop is associated with in each case at least one of the blocking elements and the blocking element is designed and/or positionable such that it blocks a movement and/or rotation of the finger stop in the end position; and
at least one preload element, wherein the at least one finger stop is associated with in each case at least one of the preload elements and the preload element is designed and/or positioned such that it provides a restoring force acting on the finger stop in the end position thereof.

5. The workpiece stop according to claim 1, wherein the at least one finger stop has a lower part and an upper part and a central part arranged therebetween, and the upper part and/or the lower part are seated movably and/or rotatably relative to the central part.

6. The workpiece stop according to claim 5, wherein the central part is immovable.

7. A device for monitoring a processing position of a workpiece in a workpiece processing machine, selected from a bending press and press brake, including:
a workpiece stop according to claim 1.

8. The device of claim 7, further including;
an imaging device for generating at least one image of an interior of a workpiece processing machine, in particular a workpiece processing machine with an interior which is not or is only incompletely visible for an operator from his/her working position, the imaging device including:
an image capturing unit adapted to receive at least one image of the interior of the machine or a part of the interior; and
an image display unit configured to display the at least one image;
wherein at least one of the image capturing unit and the image display unit is configured to present the image corresponding to a virtual operator perspective of the interior of the machine from his/her working position,
wherein the image capturing unit includes at least one mirror, in particular an adjustable mirror, for mirroring the interior of the machine and at least one camera for capturing at least one image of the mirrored interior.

9. The device according to claim 8, the imaging device for generating at least one image of the interior of a workpiece processing machine further including:
a unit for detecting the working position of the operator; and/or
a projection unit configured to project a mark of a correct processing position of a workpiece to be processed into the interior of the workpiece processing machine.

10. The device according to claim 8, wherein
the mirror is adjustably formed at a height and/or inclination, the inclination being relative to a vertical, for detecting the at least one image of the mirrored interior corresponding to the virtual perspective of the operator in the interior of the machine from his/her working position, wherein the image display unit includes or is or can be connected to a computing unit for converting the at least one image of the mirrored interior according to the virtual perspective of the operator to the interior of the workpiece processing machine from his/her working position.

11. The device according to claim 7, further including a signal output device for outputting a signal directly perceptible to an operator of a workpiece processing machine from his/her working position, having a vibration generating unit for generating and transmitting a vibration to an operating element of the workpiece processing machine as the signal.

12. The device of claim 11, wherein in the signal output device the vibration generating unit is designed such that it can be coupled in a vibration-transmitting manner to the operating element; and/or
   wherein the vibration generating unit includes a mechanical and/or acoustic vibration generator; and/or
   wherein the operating element includes one or more elements selected from a foot pedal, a floor mat, a handle, a remote control, a glove, a shoe, a watch, a mobile phone, a pair of headphones, a pair of glasses, a control panel, and any combination thereof; and/or
   wherein the signal output device is designed for wired or wireless reception of a vibration-triggering control command.

13. A workpiece processing machine, in particular a workpiece processing machine with an interior which is not or is only incompletely visible to an operator from his/her working position, in particular a bending press and/or press brake, including:
   a workpiece stop according to claim 1.

14. The workpiece processing machine of claim 13, further including:
   an imaging device for generating at least one image of the interior of a workpiece processing machine, in particular a workpiece processing machine with an interior which is not or is only incompletely visible for an operator from his/her working position, the imaging device including,
   an image capturing unit adapted to receive at least one image of the Interior of the machine or a part of the interior; and
   an image display unit configured to display the at least one image;
   wherein at least one of the image capturing unit and the image display unit is configured to present the image corresponding to a virtual operator perspective of the interior of the machine from his/her working position,
   wherein the image capturing unit includes at least one mirror, in particular an adjustable mirror, for mirroring the interior of the machine and at least one camera for capturing at least one image of the mirrored interior.

15. The workpiece processing machine according to claim 14, the imaging device for generating at least one image of the interior of a workpiece processing machine further including:
   a unit for detecting the working position of the operator; and/or
   a projection unit configured to project a mark of a correct processing position of a workpiece to be processed into the of the workpiece processing machine.

16. The workpiece processing machine according to claim 14, wherein the mirror is adjustably formed at a height and/or inclination, the inclination being relative to a vertical, for detecting the at least one image of the mirrored interior corresponding to the virtual perspective of the operator in the interior of the machine from his/her working position, wherein the image display unit includes or is or can be connected to a computing unit for converting the at least one image of the mirrored interior according to the virtual perspective of the operator to the interior of the workpiece processing machine from his/her working position.

17. The workpiece processing machine according to claim 13, further including a signal output device for outputting a signal directly perceptible to an operator of a workpiece processing machine from his/her working position, having a vibration generating unit for generating and transmitting a vibration to an operating element of the workpiece processing machine as the signal.

18. The workpiece processing machine of claim 17, wherein in the signal output device the vibration generating unit is designed such that it can be coupled in a vibration-transmitting manner to the operating element; and/or
   wherein the vibration generating unit includes a mechanical and/or acoustic vibration generator; and/or
   wherein the operating element includes one or more elements selected from a foot pedal, a floor mat, a handle, a remote control, a glove, a shoe, a watch, a mobile phone, a pair of headphones, a pair of glasses, a control panel, and any combination thereof; and/or
   wherein the signal output device is designed for wired or wireless reception of a vibration-triggering control command.

19. The workpiece processing machine according to claim 14,
   wherein the mirror of the imaging device is arranged on an interior of the workpiece processing machine corresponding to a constant or variable virtual perspective of the operator of the interior of the workpiece processing machine from his/her working position,
   the at eat one camera is aligned with the mirror, and
   the image display unit is arranged on an outside of the machine corresponding to a constant or variable virtual perspective of the operator of the interior of the workpiece processing machine from his/her working position.

20. The workpiece processing machine according to claim 14,
   wherein the interior of the workpiece processing machine comprises a workpiece stop; and
   the imaging device is formed to capture an image of the stop.

21. The workpiece processing machine according to claim 17
   wherein the signal output device is designed to output a signal triggered by the at least one sensor of the workpiece stop in the correct processing position of the workpiece.

22. A use of a device for monitoring a processing position of a workpiece according claim 7 in a bending press and/or press brake.

23. A use of a workpiece processing machine according to claim 13 for bending and/or folding a workpiece.

24. A method for processing a workpiece in a workpiece processing machine according to claim 13, in particular in a workpiece processing machine with an interior which is not or is only incompletely visible for an operator from his/her working position, including the step:
   contacting the workpiece with at least one finger stop of the machine that can be at least partially aligned and aligning the finger stop according to a correct processing position of the workpiece.

25. The method of claim 24, further including the step:
   receiving at least one image of the interior of the machine and displaying the at least one image on an exterior of the machine, corresponding to and in the position of a virtual perspective of the operator of the interior of the machine from his/her working position.

26. The method according to claim 24,
   wherein the at least one image reproduces the at least one finger stop; and/or
   wherein the capturing includes mirroring the interior of the workpiece processing machine in a mirror arranged to correspond to a virtual perspective of the operator and capturing at least one image of the mirrored interior; and/or further including the step generating and transmitting a vibration to an operating element of the machine as a signal, wherein the vibration of the operating element indicates the contact of the workpiece with the at least one finger stop and the correct processing position of the workpiece.

27. The method according to claim 25, wherein the capturing includes detecting the mirrored interior, in particular adjusting the mirror at a height and/or inclination which is relative to a vertical, corresponding to the virtual perspective of the operator of the interior of the machine from his/her working position.

28. The method according to claim 24, wherein the displaying includes transforming the at least one image of the mirrored interior corresponding to the virtual perspective of the operator to the interior of the machine from his/her working position; and/or wherein the step of receiving and displaying the at least one image of the interior of the machine includes determining the working position of the operator.

29. A computer program for operating a workpiece processing machine according to claim 13, wherein the computer program is executed on at least one of a computer, a signal output device, an imaging device and the workpiece processing machine.

30. The workpiece stop according to claim 5, wherein the upper part and the lower part are connected to each other.

31. The workpiece stop according to claim 5, wherein the upper part and the lower part are connected to each other via at least one connecting element.

32. The workpiece stop according to claim 5, wherein the upper part and the lower part are interconnected by at least one passage opening of the central part.

33. The workpiece stop according to claim 5, wherein at least one element selected from the upper part, the central part and the lower part has a recess for receiving a corner of the workpiece.

34. The workpiece stop according to claim 5, wherein the lower part and the central part at least partially have an identical contour.

35. The workpiece stop according to claim 5, wherein the upper part is smaller than the central part and forms an offset in an end position relative to the central part.

36. The workpiece stop according to claim 5, wherein the central part includes a bearing surface for the workpiece.

37. The workpiece stop according to claim 5, wherein at least one element selected from the upper part and the lower part has the at least one contact surface.

38. The workpiece stop according to claim 5, wherein the central part is provided with a friction-reducing coating.

39. The workpiece stop according to claim 38, wherein the friction-reducing coating comprises a DLC coating.

* * * * *